US012133272B2

(12) United States Patent
Chu et al.

(10) Patent No.: US 12,133,272 B2
(45) Date of Patent: Oct. 29, 2024

(54) MEDIUM PROTECTION IN WIRELESS LOCAL AREA NETWORKS

(71) Applicant: Marvell Asia Pte Ltd, Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/100,356

(22) Filed: Jan. 23, 2023

(65) Prior Publication Data

US 2023/0164853 A1 May 25, 2023

Related U.S. Application Data

(63) Continuation of application No. 17/208,432, filed on Mar. 22, 2021, now Pat. No. 11,564,264, which is a
(Continued)

(51) Int. Cl.
*H04W 74/0833* (2024.01)
*H04L 1/00* (2006.01)
(Continued)

(52) U.S. Cl.
CPC ......... *H04W 74/085* (2013.01); *H04L 1/0004* (2013.01); *H04L 5/0098* (2013.01);
(Continued)

(58) Field of Classification Search
CPC ... H04L 69/18; H04L 27/2692; H04L 5/0098; H04L 1/0004; H04W 74/085
See application file for complete search history.

(56) References Cited

U.S. PATENT DOCUMENTS 9,215,055 B2 12/2015 Chu et al.
10,153,857 B1 12/2018 Chu et al.
(Continued)

OTHER PUBLICATIONS

IEEE P802.11axTM/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 376 pages (Sep. 2016).
(Continued)

*Primary Examiner* — Siming Liu

(57) ABSTRACT

An access point (AP) generates a multi-user request to send (MU-RTS) frame for protecting a channel bandwidth during a communication exchange, and transmits the MU-RTS frame in multiple duplicate first packets in respective communication subchannels that span the channel bandwidth. Each first packet has a first packet format that conforms to a legacy protocol. The AP receives multiple clear-to-send (CTS) frames from multiple client stations via respective communication subchannels that span the channel bandwidth. The AP generates a trigger frame configured to prompt the multiple client stations to transmit respective data to the AP. After transmitting the multiple first packets, the AP transmits the trigger frame in one or more second packets that span the channel bandwidth and that conform to a second packet format defined by a non-legacy protocol. The AP receives, from the multiple client stations, data frames that are responsive to the trigger frame.

22 Claims, 10 Drawing Sheets

Related U.S. Application Data continuation of application No. 16/526,753, filed on Jul. 30, 2019, now Pat. No. 10,959,229.

(60) Provisional application No. 62/792,306, filed on Jan. 14, 2019, provisional application No. 62/736,907, filed on Sep. 26, 2018, provisional application No. 62/722,070, filed on Aug. 23, 2018, provisional application No. 62/712,804, filed on Jul. 30, 2018.

(51) Int. Cl.
| | | |
|---|---|---|
| *H04L 5/00* | (2006.01) | |
| *H04L 27/26* | (2006.01) | |
| *H04L 69/18* | (2022.01) | |
| *H04W 8/24* | (2009.01) | |
| *H04W 40/24* | (2009.01) | |
| *H04W 56/00* | (2009.01) | |
| *H04W 72/0446* | (2023.01) | |
| *H04W 72/0453* | (2023.01) | |
| *H04W 80/02* | (2009.01) | |
| *H04W 84/12* | (2009.01) | |

(52) U.S. Cl.
CPC .......... *H04L 27/2692* (2013.01); *H04L 69/18* (2013.01); *H04W 8/24* (2013.01); *H04W 40/244* (2013.01); *H04W 56/001* (2013.01); *H04W 72/0446* (2013.01); *H04W 72/0453* (2013.01); *H04W 80/02* (2013.01); *H04W 84/12* (2013.01)

(56) References Cited

U.S. PATENT DOCUMENTS

| | | | |
|---|---|---|---|
| 10,367,614 | B2 | 7/2019 | Chu et al. |
| 10,952,216 | B2 | 3/2021 | Chu et al. |
| 10,959,229 | B2 | 3/2021 | Chu et al. |
| 11,564,264 | B2 | 1/2023 | Chu et al. |
| 2011/0305156 | A1 | 12/2011 | Liu et al. |
| 2016/0366701 | A1* | 12/2016 | Chu ............... H04W 74/002 |
| 2018/0092127 | A1* | 3/2018 | Park ............... H04W 72/0453 |
| 2019/0007973 | A1* | 1/2019 | Lou ............... H04W 74/0816 |
| 2019/0037595 | A1* | 1/2019 | Cherian ............. H04W 74/006 |

OTHER PUBLICATIONS

IEEE P802.11axTM/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11axTM/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11axTM/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11axTM/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11acTM—2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHZ," The Institute of Electrical and Electronics Engineers, Inc., pp. 1-425 (Dec. 18, 2013).

IEEE Std. 802.Nov. 2016, "IEEE Standard for Information Technology—Local and Metropolitan Area Networks—Specific Requirements, Part 11: Wireless LAN Mac and PHY Specifications," Section 10.22.2.7, pp. 1384-1387 (Dec. 14, 2016).br.

IEEE Std. 802.Nov. 2016, "IEEE Standard for Information Technology—Local and Metropolitan Area Networks—Specific Requirements, Part 11: Wireless LAN Mac and PHY Specifications," Section 10.28, pp. 1451-1454 (Dec. 14, 2016).br.

IEEE Std. 802.11nTM "IEEE Standard for Information Technology—Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

International Search Report and Written Opinion in International Patent Application No. PCT/US2019/044235, mailed Nov. 19, 2019 (13 pages).

Stacey, "Specification Framework for TGax," doc. IEEE 802.11-15/0132r12, vol. 802.11ax, No. 12, 38 pages (Dec. 1, 2015).

U.S. Appl. No. 17/200,545, Chu et al., "Wireless Local Area Network Management," filed Mar. 12, 2021.

U.S. Appl. No. 62/352,719, Chu et al., "MU Resource Request, TID Selection, and Responding Rules," filed on Jun. 21, 2016.

Yang et al., "11ax D1.0 Comment Resolution for RDG MU," IEEE draft 802.11-17-1440r1, pp. 1-6 (Sep. 10, 2017).

\* cited by examiner

MEDIUM PROTECTION IN WIRELESS LOCAL AREA NETWORKS

CROSS REFERENCES TO RELATED APPLICATIONS

The present application is a continuation of U.S. application Ser. No. 17/208,432 (now 11,564,264), entitled "MEDIUM PROTECTION IN WIRELESS LOCAL AREA NETWORKS," filed on Mar. 22, 2021, which is a continuation of U.S. patent application Ser. No. 16/526,753 (now U.S. Pat. No. 10,959,229), entitled "MEDIUM PROTECTION IN WIRELESS LOCAL AREA NETWORKS," filed Jul. 30, 2019, which claims the benefit of the following U.S. Provisional Patent Applications:
- U.S. Provisional Patent Application No. 62/712,084, entitled "High Efficiency (HE) Operation at 6 GHz Band," filed on Jul. 30, 2018;
- U.S. Provisional Patent Application No. 62/722,070, entitled "High Efficiency (HE) Operation at 6 GHz Band," filed on Aug. 23, 2018;
- U.S. Provisional Patent Application No. 62/736,907, entitled "High Efficiency (HE) Operation at 6 GHz Band," filed on Sep. 26, 2018; and
- U.S. Provisional Patent Application No. 62/792,306, entitled "High Efficiency (HE) Operation at 6 GHz Band," filed on Jan. 14, 2019.

Additionally, this application is related to U.S. patent application Ser. No. 16/526,808 (now U.S. Pat. No. 10,952,216), entitled "Wireless Local Area Network Management," filed Jul. 30, 2019.

The disclosures of all of the above-referenced patent applications are hereby incorporated by reference herein in their entireties.

FIELD OF TECHNOLOGY

The present disclosure relates generally to wireless communication systems, and more particularly to protecting transmissions in a wireless communication network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard, now in the final stages of development, significantly improves throughput over the IEEE 802.11ac Standard.

Communications between communication devices in a WLAN may occur during a transmit opportunity (TXOP) during which one of more frame exchanges are preformed between a communication device and one or more other communications devices. In a typical WLAN in which multiple frame exchanges are performed during a TXOP, a bandwidth of a frame exchange during a TXOP can be reduced relative of a bandwidth of a previous frame exchange during the TXOP. However, in a typical WLAN, a bandwidth of a frame exchange during a TXOP cannot be increased in a following frame exchange in the TXOP unless the TXOP is protected by an initial request-to-send (RTS)/clear-to-send (CTS) frame exchange performed at the beginning of the TXOP.

SUMMARY

In an embodiment, a method for communicating in a wireless local area network (WLAN) includes: generating, at an access point (AP), a multi-user request to send (MU-RTS) frame for protecting a channel bandwidth during a communication exchange with a plurality of client stations; transmitting, by the AP, the MU-RTS frame in a plurality of duplicate first packets in respective communication subchannels that span the channel bandwidth, each first packet having a first packet format conforming to a legacy communication protocol; receiving, at the AP, a plurality of clear-to-send (CTS) frames from the plurality of client stations via respective communication subchannels that span the channel bandwidth, the plurality of CTS frames responsive to the plurality of duplicate first packets; generating, at the AP, a trigger frame configured to prompt the plurality of client stations to transmit respective data to the AP; after transmitting the plurality of first packets having the first format, transmitting, by the AP, the trigger frame in one or more second packets that span the channel bandwidth, each second packet conforming to a second packet format defined by a non-legacy communication protocol; and receiving, at the AP, a plurality data frames from the plurality of client stations, the plurality of data frames responsive to the trigger frame in the one or more second packets.

In another embodiment, a communication device comprises a wireless network interface device associated with an AP. The wireless network interface device includes one or more integrated circuit (IC) devices configured to: generate an MU-RTS frame for protecting a channel bandwidth during a communication exchange with a plurality of client stations; control the wireless network interface device to transmit the MU-RTS frame in a plurality of duplicate first packets in respective communication subchannels that span the channel bandwidth, each first packet having a first packet format conforming to a legacy communication protocol; receive a plurality of CTS frames from the plurality of client stations via respective communication subchannels that span the channel bandwidth, the plurality of CTS frames responsive to the plurality of duplicate first packets; generate a trigger frame configured to prompt the plurality of client stations to transmit respective data to the AP; control the wireless network interface device to transmit, after transmitting the plurality of first packets having the first format, the trigger frame in one or more second packets that span the channel bandwidth, each second packet conforming to a second packet format defined by a non-legacy communication protocol; and receive a plurality data frames from the plurality of client stations, the plurality of data frames responsive to the trigger frame in the one or more second packets.

In yet another embodiment, a method for communicating in a WLAN includes: receiving, at a client station, an MU-RTS frame for protecting a channel bandwidth during a communication exchange with an AP, the MU-RTS frame having been transmitted by the AP in respective communication subchannels that span the channel bandwidth, each first packet having a first packet format conforming to a legacy communication protocol; generating, at the client station, a CTS frame that is responsive to the MU-RTS frame; transmitting, by the client station, the CTS frame to the AP in response to the MU-RTS frame via one of the communication subchannels simultaneously with transmission of one or more other CTS frames by one or more other client stations within the channel bandwidth; after receiving the MU-RTS frame, receiving, at the client station, a trigger frame that is configured to prompt the client station and one or more other client stations to transmit respective data to the AP, the trigger frame having been transmitted by the AP in one or more second packets that span the channel bandwidth, each second packet conforming to a second packet format defined by a non-legacy communication protocol; generating, at the client station, a data frame that is responsive to the trigger frame; and transmitting, by the client station, the data frame to the AP in response to the trigger frame via one of the communication subchannels simultaneously with transmission of one or more other data frames by one or more other client stations within the channel bandwidth.

In still another embodiment, a communication device comprises a wireless network interface device associated with a client station. The wireless network interface device includes one or more IC devices configured to: receive a multi-user request to send (MU-RTS) frame for protecting a channel bandwidth during a communication exchange with an access point (AP), the MU-RTS frame having been transmitted by the AP in respective communication subchannels that span the channel bandwidth, each first packet having a first packet format conforming to a legacy communication protocol; generate a clear-to-send (CTS) frame that is responsive to the MU-RTS frame; control the wireless network interface device to transmit the CTS frame to the AP in response to the MU-RTS frame via one of the communication subchannels simultaneously with transmission of one or more other CTS frames by one or more other client stations within the channel bandwidth; after receiving the MU-RTS frame, receive a trigger frame that is configured to prompt the client station and one or more other client stations to transmit respective data to the AP, the trigger frame having been transmitted by the AP in one or more second packets that span the channel bandwidth, each second packet conforming to a second packet format defined by a non-legacy communication protocol; generate a data frame that is responsive to the trigger frame; and control the wireless network interface device to transmit the data frame to the AP in response to the trigger frame via one of the communication subchannels simultaneously with transmission of one or more other data frames by one or more other client stations within the channel bandwidth.

DETAILED DESCRIPTION

Figure 1:
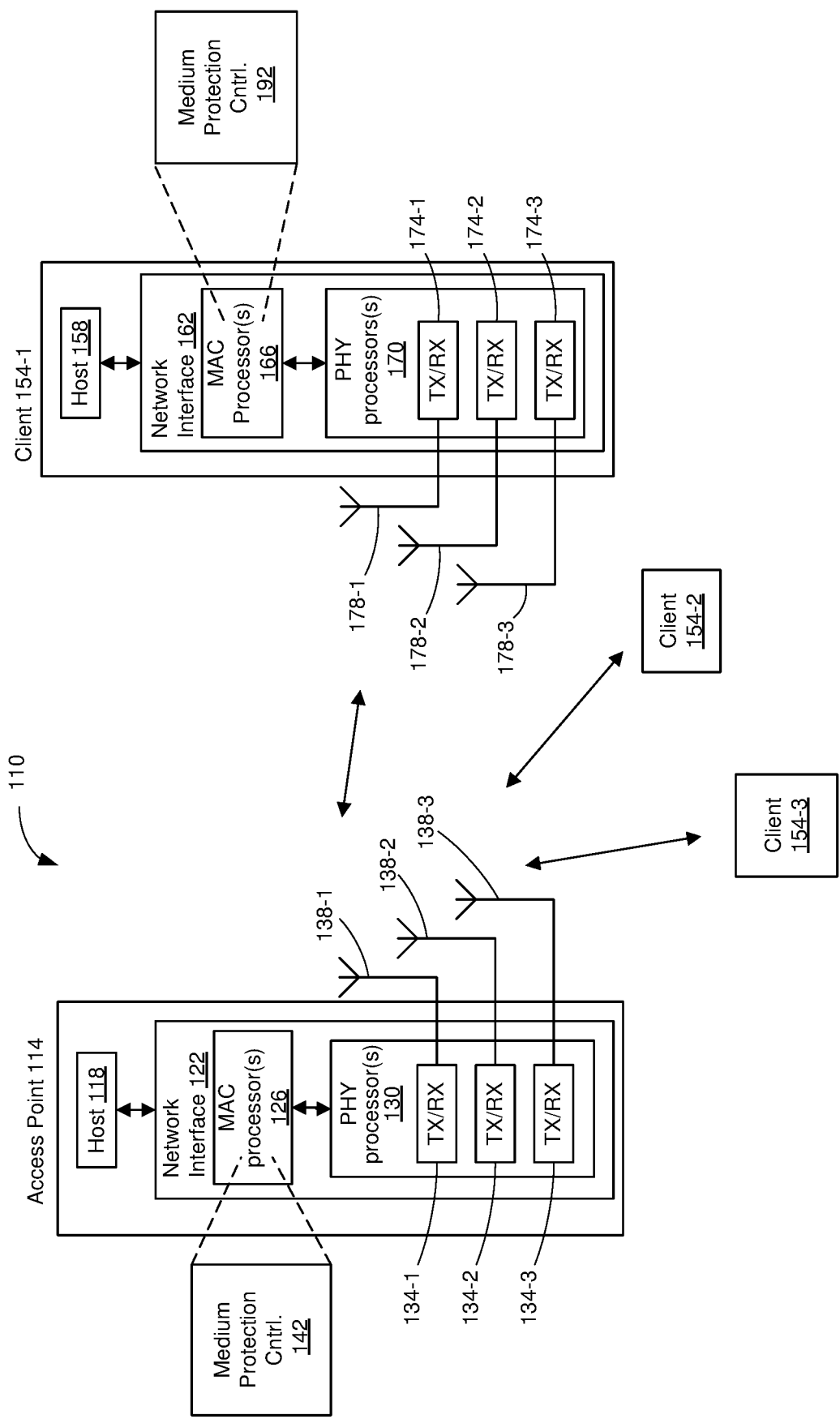
FIG. 1 is a block diagram of an example wireless local area network (WLAN), according to an embodiment.

In embodiments described below, a wireless communication device such as an access point (AP) or a client station in a wireless network, such as a wireless local area network (WLAN) managed by the AP, is configured to operate i) in at least a first frequency band and ii) according to at least a first communication protocol. For example, in an embodiment, the first communication protocol is the IEEE 802.11ax Standard, now in the final stages of being standardized, and the first frequency band is a 6 GHz band (5.925 to 7.125 GHz) recently released by the Federal Communication Commission (FCC) for WLAN operation. In some embodiments, the wireless communication device is additionally configured to operate i) in a second frequency band and/or a third frequency band and/or ii) according to a second communication protocol, according to a third communication protocol and/or according to a fourth communication protocol. For example, in an embodiment, the second frequency band is the 5 GHz band (approximately 5.170 to 5.835 GHz), and the third frequency band is the 2.4 GHz band (approximately 2.4 to 2.5 GHz). As an example, in an embodiment, the second communication protocol is the IEEE 802.11ac Standard, the third communication protocol is the IEEE 802.11n Standard, and the fourth communication protocol is the IEEE 802.11a Standard. The second communication protocol, the third communication protocol and the fourth communication protocol are legacy communication protocols with respect to the first communication protocol, in an embodiment. The fourth communication protocol is legacy with respect to the first communication protocol, the second communication protocol, and the third communication protocol, in an embodiment. In an embodiment, transmissions (e.g., data units that include control information, management information and/or data) that conform to the first communication protocol (e.g., conform to a physical layer data unit format specified by the first communication protocol) and transmissions (e.g., at least data units that include control information) that conform to the fourth communication protocol (e.g., conform to a physical layer data unit format specified by the fourth communication protocol) are allowed in the first frequency band. On the other hand, transmissions (e.g., data units that include control information, management information and/or data) that conform to the second communication protocol (e.g., conform to a physical layer data unit format specified by the second communication protocol) and transmissions (e.g., data units that include control information, management information and/or data) that conform to the third communication protocol (e.g., conform to a physical layer data unit format specified by the third communication protocol) are not allowed in the first frequency band, in an embodiment.

In various embodiments, the communication device (e.g., the AP or the client station) transmits various control frames, such as request-to-send (RTS) frames, clear-to-send (CTS) frames, trigger frames, acknowledgement frames, etc. Control frames are utilized to assist with transmission of data, for example by reserving a communication channel for data transmissions to protect the data transmissions from potential collisions with transmissions by other communication devices, in an embodiment. In current WLANs, such control frames are typically transmitted using physical layer data units that conform to a legacy physical layer data unit format (e.g., a physical layer data unit format specified by the fourth communication protocol) and using legacy control frame transmission rules (e.g., as specified by the fourth communication protocol) to allow legacy communication devices to receive and decode the data unit that include the control frames. In some embodiments described below, physical layer data unit format used for transmission of at least some types of control frames depends on whether the control frames are transmitted in the first frequency band or transmitted in the second or third frequency. For example, the communication device selectively utilizes the legacy physical layer data unit format and the legacy control frame transmission rules specified by the fourth communication protocol when transmitting a control frame in the first frequency band, the second frequency band or the third frequency band, and, additionally, utilizes non-legacy physical layer data unit formats and/or non-legacy transmission rules specified by the first communication protocol in at least some situations when transmitting the control frame in the first frequency band. In some situations, transmission of the control frame using non-legacy physical layer data unit formats and/or non-legacy transmission rules when transmitting the control frame in the first frequency band results in more robust transmission of the control frame in the first frequency band, for example, as compared to transmission of the control frames in the second frequency band and/or the third frequency band, in at least some embodiments. In some situations, transmission of the control frame using non-legacy physical layer data unit formats and/or non-legacy transmission rules when transmitting the control frame in the first frequency band additionally or alternatively results in more efficient transmission of the control frame in the first frequency band, for example, as compared to transmission of the control frames in the second frequency band and/or the third frequency band, in at least some embodiments.

In various embodiments, the communication device (e.g., the AP or the client station) transmits multiple frames to at least one other communication device during a transmit opportunity (TXOP) obtained by the communication device. In current WLANs, when multiple frame exchanges occur during a TXOP, the bandwidth of any frame exchange cannot be greater than the bandwidth of an immediately preceding frame exchange in the TXOP unless the TXOP is protected by an initial control frame exchange (e.g., a request-to-send (RTS)/clear-to-send (CTS) frame exchange), that conforms to a legacy communication protocol (e.g., the fourth communication protocol) and that occurred prior to transmission of the multiple frames during the TXOP. Thus, for example, if a bandwidth of a second frame exchange during the TXOP is decreased with respect to a bandwidth of a first frame exchange that occurred prior to the second exchange during the TXOP, a bandwidth of any consequent frame exchange during the TXOP cannot be greater than the reduced bandwidth of the second frame exchange of the TXOP unless the TXOP is protected by an initial RTS/CTS frame exchange, that conforms to the fourth communication protocol, prior to transmission of the multiple frames. In embodiments described below, TXOP communication channel protection mechanisms allow for a reduced bandwidth of a frame exchange during a TXOP to be increased in a following frame exchange in the TXOP in at least some situations in which the TXOP is not protected by an initial RTS/CTS frame exchange that conforms to the fourth communication protocol, at least for operation in the first frequency band. Thus, for example, transmission of an initial RTS/CTS frame exchange is not required in order to allow for a reduced bandwidth of a frame exchange during the TXOP to be increased in a following frame exchange in the TXOP, at least in the first frequency band, in an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 is configured for operation within a single RF band at a given time. In another embodiment, the network interface device 122 is configured for operation within two or more RF bands at the same time or at different times. In an embodiment, the network interface device 122 implements multiple APs (e.g., co-located APs), respective APs operating in respective ones of the frequency bands. For example, in an embodiment, the network interface device 122 includes multiple PHY processors 130, where respective PHY processors 130 correspond to respective ones of the co-located APs for operation in respective ones of the frequency bands. In another embodiment, the network interface device 122 includes a single PHY processor 130, where each transceiver 134 includes respective RF radios corresponding to respective ones of the co-located APs for operation in respective ones of the frequency bands. In an embodiment, the network interface device 122 includes multiple MAC processors 126, where respective MAC processors 126 correspond to respective ones of the co-located APs for operation in respective ones of the frequency bands. In another embodiment, the network interface device 122 includes a single MAC processor 126 corresponding to the multiple co-located APs for operation in respective ones of the frequency bands.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a medium protection controller 142. The medium protection controller 142 implements medium protection mechanisms of the AP 114 in at least the first frequency band (e.g., the 6 GHz band). In some embodiments, the medium protection controller 142 additionally implements medium protection mechanisms of the AP 114 in one or more additional frequency bands, such as the second frequency band (e.g., the 5 GHz band) and/or the third frequency band (e.g., the 2.4 GHz band).

As will be described in more detail below, the medium protection controller 142 generates a control frame (e.g., an RTS, a CTS frame, a trigger frame, an acknowledgement frame, etc.), and prompts the PHY processor 130 to transmit the control frame to one or more client stations 154, for example to reserve a communication channel for transmissions between the AP 114 and the one or more client stations 154. In an embodiment, the medium protection controller 142 prompts the PHY processor 130 to transmit the control frame using a particular PHY data unit format and/or particular transmission rules, where the particular PHY data unit format and/or the particular transmission rules depend on the particular frequency band in which the control frame is to be transmitted. For example, when the control frame is to be transmitted in the second frequency band or in the third frequency band, the medium protection controller 142 prompts the PHY processor 130 to transmit the control frame using a legacy PHY data unit format (e.g., a PHY data unit format specified by the fourth communication protocol) and legacy transmission rules (e.g., specified by the fourth communication protocol). On the other hand, when the control frame is to be transmitted in the first frequency band, the medium protection controller 142 selectively prompts the PHY processor 130 to transmit the control frame i) using a legacy PHY data unit format (e.g., a PHY data unit format specified by the fourth communication protocol) and legacy transmission rules or ii) using a non-legacy PHY data unit format and/or non-legacy transmission rules. Transmission of the control frame using non-legacy PHY data unit formats and/or non-legacy transmission rules in the first frequency band results in more efficient and/or more robust transmission of the control frame in the first frequency band, for example, as compared to transmission of control frames in the second frequency band and in the third frequency band, in at least some embodiments.

Permitting the PHY format that conforms to the fourth communication protocol for transmission of control frames simplifies implementation of multiple co-located communication devices (e.g., APs or client stations) within a single communication device, in an embodiment. For example, in an embodiment in which control frames are transmitted using the PHY format that conforms to the fourth communication protocol in the second frequency and and/or the third frequency band, permitting the PHY format that conforms to the fourth communication protocol for transmission of control frames in the first frequency band facilitate the use of a single MAC processor of the communication device to implement MAC functions for operation of multiple co-located communication devices i) in the first frequency band and ii) in the second and/or third frequency band, in at least some embodiments.

In an embodiment, the medium protection controller 142 generates multiple frames (e.g., control, management and/or data frames), and prompts the PHY processor to transmit the multiple frames to one or more client stations 154 during a transmit opportunity (TXOP) for transmissions between the AP 114 and one or more client stations 154-1. In an embodiment, the medium protection controller 142 determines a bandwidth to be used for transmission of a frame of the multiple frames, and prompts the PHY processor 130 to transmit the frame using a PHY data unit that spans the determined bandwidth of the frame. As will be explained in more detail below, in at least some situations, the medium protection controller 142 determines that a bandwidth of a frame to be transmitted during the TXOP can be increased with respect to a bandwidth of a previous frame transmitted during the TXOP in at least some situations in which the TXOP is not protected by an initial control frame exchange, that conforms to a legacy communication protocol (e.g., the fourth communication protocol), prior to transmission of the multiple frames during the TXOP. For example, in an embodiment, the medium protection controller 142 determines that the wider bandwidth has been reserved for transmissions between the AP 114 and the one or more client stations 154, for the duration of the TXOP, by previous transmissions of non-legacy data units during the TXOP. In at least some such situations, the medium protection controller 142 generates the frame for transmission in the wider bandwidth, and prompts the PHY processor 130 to transmit the frame using a PHY data unit that spans the determined wider bandwidth. Because the bandwidth of a frame transmitted during a TXOP is increased with respect to the bandwidth of a previously transmitted frame during the TXOP even if the TXOP is not protected by an initial control frame exchange, that conforms to a legacy communication protocol (e.g., the fourth communication protocol), prior to transmission of the multiple frames during the TXOP, more information (e.g., management information, data, etc.) can be transmitted during the TXOP as compared to systems in which frame bandwidth cannot be increased during the TXOP, in at least some embodiments.

In an embodiment, the medium protection controller 142 is implemented by a processor executing machine readable instructions stored in a memory, where the machine readable instructions cause the processor to perform acts described in more detail below. In another embodiment, the medium protection controller 142 additionally or alternatively comprises one or more hardware state machines that are configured to perform acts described in more detail below.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the network interface device 162 is configured for operation within a single RF band at a given time. In another embodiment, the network interface device 162 is configured for operation within two or more RF bands at the same time or at different times. In an embodiment, the network interface device 162 implements multiple APs (e.g., co-located client stations), respective client stations operating in respective ones of the frequency bands. For example, in an embodiment, the network interface device 162 includes multiple PHY processors 170, where respective PHY processors 170 correspond to respective ones of the co-located client stations for operation in respective ones of the frequency bands. In another embodiment, the network interface device 162 includes a single PHY processor 170, where each transceiver 174 includes respective RF radios corresponding to respective ones of the co-located client stations for operation in respective ones of the frequency bands. In an embodiment, the network interface device 162 includes multiple MAC processors 166, where respective MAC processors 166 correspond to respective ones of the co-located client stations for operation in respective ones of the frequency bands. In another embodiment, the network interface device 162 includes a single MAC processor 166 corresponding to the multiple co-located client stations for operation in respective ones of the frequency bands.

The network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, a medium protection controller 192. The medium protection controller 192 implements medium protection mechanisms of the AP 114 in at least the first frequency band (e.g., the 6 GHz band). In some embodiments, the medium protection controller 192 additionally implements medium protection mechanisms of the AP 114 in one or more additional frequency bands, such as the second frequency band (e.g., the 5 GHz band) and/or the third frequency band (e.g., the 2.4 GHz band).

As will be described in more detail below, the medium protection controller 192 generates a control frame (e.g., an RTS frame, a CTS frame, an acknowledgement frame, etc.), and prompts the PHY processor 170 to transmit the control frame the AP 114, for example to reserve a communication channel for transmissions between the client station 154-1 and the AP 114. In an embodiment, the medium protection controller 192 prompts the PHY processor 170 to transmit the control frame using a particular PHY data unit format and/or particular transmission rules, where the particular PHY data unit format and/or the particular transmission rules depend on the particular frequency band in which the control frame is to be transmitted. For example, when the control frame is to be transmitted in the second frequency band or in the third frequency band, the medium protection controller 192 prompts the PHY processor 170 to transmit the control frame using a legacy PHY data unit format and legacy transmission rules. On the other hand, when the control frame is to be transmitted in the first frequency band, the medium protection controller 192 selectively prompts the PHY processor 170 to transmit the control frame i) using a legacy PHY data unit format (e.g., a PHY data unit format specified by the fourth communication protocol) and legacy transmission rules or ii) using a non-legacy PHY data unit format and/or non-legacy transmission rules. Transmission of the control frame using non-legacy PHY data unit formats and/or non-legacy transmission rules in the first frequency band results in more efficient and/or more robust transmission of the control frame in the first frequency band, for example, as compared to transmission of control frames in the second frequency band and in the third frequency band, in at least some embodiments.

In an embodiment, the medium protection controller 192 generates multiple frames (e.g., control, management and/or data frames), and prompts the PHY processor to transmit the multiple frames to the AP 114 during a transmit opportunity (TXOP) for transmissions between the client station 154-1 (or a group of client stations 154 of which the client station 154-1 is a part) and the AP 114. In an embodiment, the medium protection controller 192 determines a bandwidth to be used for transmission of a frame of the multiple frames, and prompts the PHY processor 170 to transmit the frame using a PHY data unit that spans the determined bandwidth of the frame. As will be explained in more detail below, in at least some situations, the medium protection controller 192 determines that a bandwidth of a frame to be transmitted during the TXOP can be increased with respect to a bandwidth of a previous frame transmitted during the TXOP in at least some situations in which the TXOP is not protected by an initial control frame exchange, that conforms to a legacy communication protocol (e.g., the fourth communication protocol) and that occurred prior to transmission of the multiple frames during the TXOP. For example, in an embodiment, the medium protection controller 192 determines that the wider bandwidth has been reserved for transmissions between the client station 154-1 (or the group of client stations 154 of which the client station 154-1 is a part) and the AP 114, for the duration of the TXOP, by previous transmissions of non-legacy data units during the TXOP. In at least some such situations, the medium protection controller 192 generates the frame for transmission in the wider bandwidth, and prompts the PHY processor 170 to transmit the frame using a PHY data unit that spans the determined wider bandwidth. Because the bandwidth of a frame transmitted during a TXOP is increased with respect to the bandwidth of a previously transmitted frame during the TXOP even if the TXOP is not protected by an initial control frame exchange that conforms to a legacy communication protocol (e.g., the fourth communication protocol), more information (e.g., management information, data, etc.) can be transmitted during the TXOP as compared to systems in which frame bandwidth cannot be increased during the TXOP, in at least some embodiments.

In an embodiment, the medium protection controller 192 is implemented by a processor executing machine readable instructions stored in a memory, where the machine readable instructions cause the processor to perform acts described in more detail below. In another embodiment, the medium protection controller 192 additionally or alternatively comprises one or more hardware state machines that are configured to perform acts described in more detail below.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
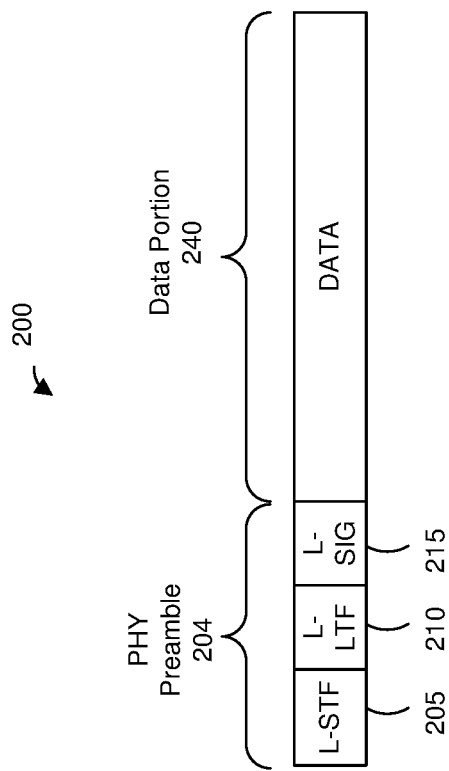
FIG. 2 is a block diagram of an example physical layer (PHY) data unit transmitted by communication devices in the WLAN of FIG. 1, according to an embodiment.

FIG. 2 is a diagram of an example PPDU 200 that the network interface device 122 (FIG. 1) is configured to generate and transmit to one or more client stations 154 (e.g., the client station 154-1), according to an embodiment. If the PPDU is transmitted by a client station 154, the network interface device 122 (FIG. 1) is also configured to receive and process the PPDU 200, according to an embodiment.

The network interface device 162 (FIG. 1) is also configured to generate and transmit the PPDU 200 to the AP 114, according to an embodiment. If the PPDU is transmitted by the AP 114, the network interface device 162 (FIG. 1) is also configured to receive and process the PPDU 200, according to an embodiment.

The PPDU 200 conforms to a legacy physical layer format. In an embodiment, the PPDU 200 is referred to as a non-high-throughput (non-HT) PHY data unit. The PPDU 200 occupies a 20 MHz bandwidth or another suitable bandwidth, in an embodiment. Data units similar to the PPDU 200 occupy other suitable bandwidths that correspond to an aggregation of multiple component channels (e.g., each having a 20 MHz bandwidth or another suitable bandwidth), in other embodiments.

The PPDU 200 includes a PHY preamble 204. The PHY preamble 204 conforms to a legacy PHY preamble format and includes a legacy short training field (L-STF) 205, a legacy long training field (L-LTF) 210, a legacy signal field (L-SIG) 215, in an embodiment. The L-STF 205 generally includes information that is useful for packet detection and synchronization, whereas the L-LTF 210 generally includes information that is useful for channel estimation and fine synchronization. The L-SIG 215 generally signals PHY parameters to the receiving devices, including legacy devices, such as a length of the PPDU 300. In an embodiment, the PHY preamble 204 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200. The PPDU 200 also includes a PHY data portion 240, in an embodiment. The PHY data portion 240 includes an MPDU, in an embodiment. In some scenarios, the PPDU 200 may omit the data portion 240.

Figure 3:
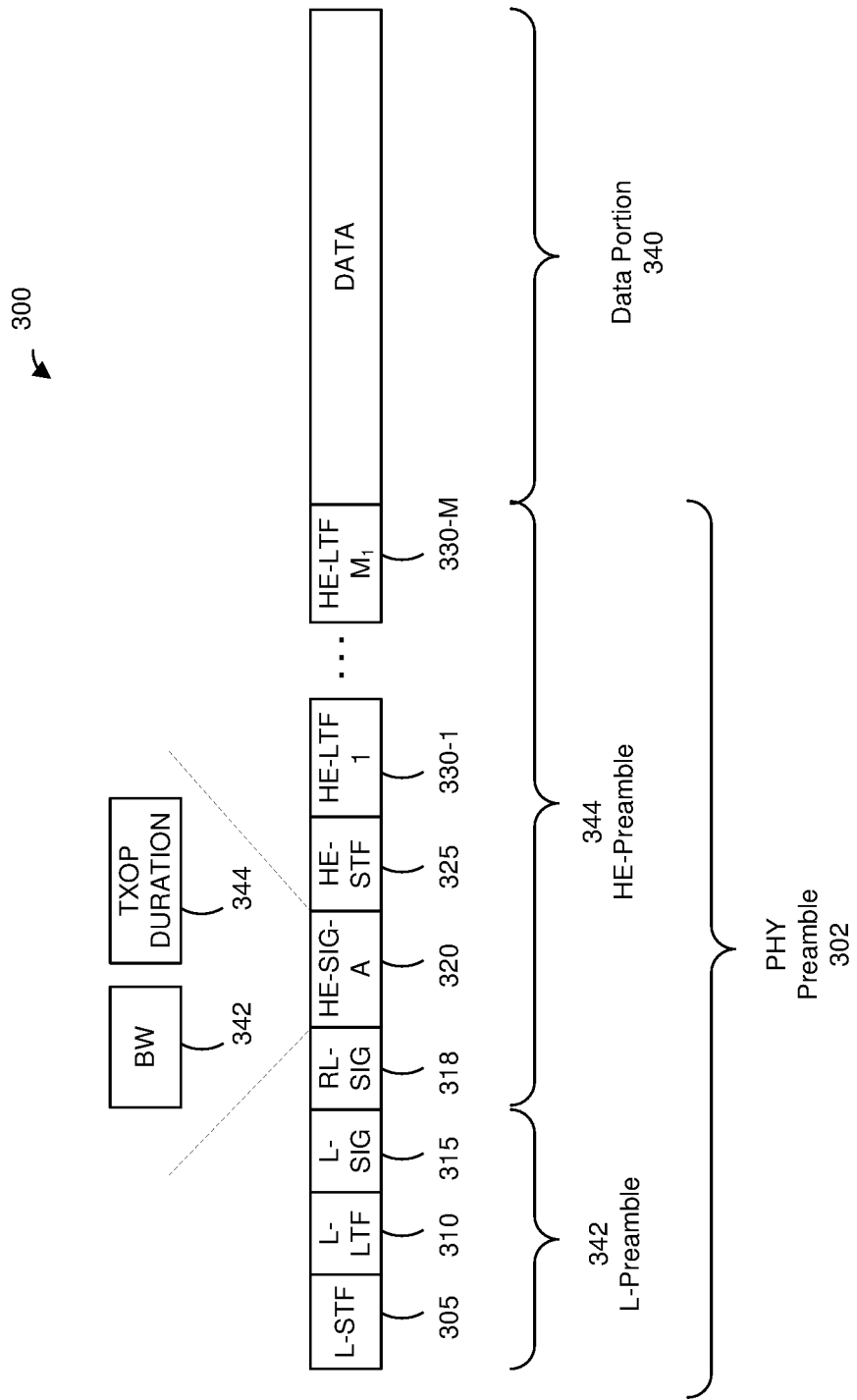
FIG. 3 is a block diagram of another example physical layer (PHY) data unit transmitted by communication devices in the WLAN of FIG. 1, according to an embodiment.

FIG. 3 is a diagram of an example PPDU 300 that the network interface device 122 (FIG. 1) is configured to generate and transmit to one or more client stations 154 (e.g., the client station 154-1), according to an embodiment. If the PPDU is transmitted by a client station 154, the network interface device 122 (FIG. 1) is also configured to receive and process the PPDU 300, according to an embodiment.

The network interface device 162 (FIG. 1) is also configured to generate and transmit the PPDU 300 to the AP 114, according to an embodiment. If the PPDU is transmitted by the AP 114, the network interface device 162 (FIG. 1) is also configured to receive and process the PPDU 300, according to an embodiment.

The PPDU 300 includes a preamble 302 including a legacy short training field (L-STF) 305, a legacy long training field (L-LTF) 310, a legacy signal field (L-SIG) 315, a repeated L-SIG field (RL-SIG) 318, a high efficiency (HE) signal field (HE-SIG-A) 320, an HE short training field (HE-STF) 325, and M HE long training fields (HE-LTFs) 330, where M is a suitable positive integer. In an embodiment, M generally corresponds to (e.g., is greater than or equal to) a number of spatial streams via which the data unit 300 will be transmitted. A legacy preamble portion 342 of the preamble 302 includes the L-STF 305, L-LTF 310 and L-SIG 315. An HE preamble portion 344 of the preamble 302 includes the RL-SIG 318, the HE-SIG-A 320, the HE-STF 325 and the M HE-LTFs 330. The data unit 300 also includes a data portion 340. The PHY data portion 340 includes an MPDU, in an embodiment. In some scenarios, the PPDU 300 may omit the data portion 340.

The L-STF 305 generally includes information that is useful for packet detection and synchronization, whereas the L-LTF 310 generally includes information that is useful for channel estimation and fine synchronization. The L-SIG 315 generally signals PHY parameters to the receiving devices, including legacy devices, such as a length of the PPDU 300.

The HE-STF 325 generally includes information that is useful for improving automatic gain control estimation in a MIMO transmission. The HE-LTFs 330 generally includes information that is useful for estimating a MIMO channel.

In some embodiments, the preamble 302 omits one or more of the fields 305-330. In some embodiments, the preamble 302 includes additional fields not illustrated in FIG. 2.

Each of the L-STF 305, the L-LTF 310, the L-SIG 315, the RL-SIG 318, the HE-SIG-A 320, the HE-STF 325, and the M HE-LTFs 330 comprises one or more OFDM symbols. As merely an illustrative example, the HE-SIG-A 320 comprises two OFDM symbols.

In the illustration of FIG. 2, the PPDU 300 includes one of each of the L-STF 305, the L-LTF 310, the L-SIG 315, the RL-SIG 318 and the HE-SIG-A 320. In some embodiments in which a data unit similar to the data unit 300 occupies a cumulative bandwidth other than 20 MHz, each of the L-STF 305, the L-LTF 310, the L-SIG 315, the RL-SIG 318, and the HE-SIG-A 320 is repeated over a corresponding number of 20 MHz sub-bands of the whole bandwidth of the data unit, in an embodiment. For example, in an embodiment in which the data unit occupies an 80 MHz bandwidth, the PPDU 300 includes four of each of the L-STF 305, the L-LTF 310, the L-SIG 315, the RL-SIG 318, and the HE-SIG-A 320 in respective 20 MHz sub-bands.

In an embodiment, the HE-SIG-A 320 generally carries information about the format of the PPDU 300, such as information needed to properly decode at least a portion of the PPDU 300, in an embodiment. In some embodiments, HE-SIG-A 320 additionally includes information for receivers that are not intended receivers of the PPDU 300, such as information needed for medium protection, spatial reuse, etc.

In an embodiment, the HE-SIG-A field 320 includes a bandwidth subfield 342 and a TXOP subfield 344. The bandwidth subfield 342 includes information indicating the bandwidth of the PPDU 300. The TXOP duration subfield 344 includes information indicating a time duration of a remainder of a TXOP, in which the PPDU 300 is transmitted, after transmission of the PPDU 300. In an embodiment, the communication device (e.g., the AP 114 or the client station 154-1) that initiates the TXOP (sometime referred to herein as "TXOP holder") sets the TXOP subfield 344 to a valid value to inform other communication devices of the duration of the TXOP and to reserve the communication channel corresponding to the bandwidth of the PPDU 300, indicated by the bandwidth subfield 342, for the duration of the TXOP. In some situations, the TXOP holder sets the TXOP duration subfield 344 to indicate that the TXOP is unspecified, in an embodiment. In such situations, the TXOP holder does not reserve the communication channel for the TXOP, in an embodiment. In an embodiment, the TXOP holder is not permitted to set the TXOP duration subfield 344 to indicate that the TXOP is unspecified when the PPDU 300 is transmitted in the first frequency band unless a valid TXOP duration value is disallowed. In an embodiment, a valid TXOP duration value is disallowed when one or both of the following conditions are satisfied (i) BSS color is currently disabled (e.g., as indicated by a BSS color disabled field in a most recent operation element (e.g., HE operation element) transmitted or received by the TXOP holder) and (ii) the PPDU 300 includes a power save poll (PS-Poll) frame. Thus, in an embodiment, when the PPDU 300 is transmitted in the first frequency band, the TXOP holder does not set the TXOP duration subfield 344 to a value indicating that the TXOP is unspecified unless one or both of the conditions (i) and (ii) are satisfied.

In some embodiments, a format similar to the format in FIG. 2 is defined for an extended range SU PPDU, where a duration of an HE-SIG-A field is twice the duration of the HE-SIG-A 320. For example, in an embodiment, information in the HE-SIG-A field 320 is included twice so that the duration of the HE-SIG-A field in the extended range SU PPDU is twice the duration of the HE-SIG-A 320.

Additionally, for an extended range SU PPDU, transmit power is boosted for certain fields (and/or certain OFDM tones of certain fields) of the preamble 302 as compared to a transmit power of other fields/portions of the extended range SU PPDU, such as the data portion 340, according to some embodiments. For example, a transmit power boost of 3 decibels (dB) is applied to one of, or any suitable combination of two or more of, L-STF 305, L-LTF 310, HE-STF 325, and/or HE-LTF(s) 330, as compared to a transmit power of other fields/portions of the extended range SU PPDU, such as the data portion 340, according to some embodiments. Such a transmit power boost to fields such as L-STF 305, L-LTF 310, HE-STF 325, and/or HE-LTF(s) 330, help to improve packet detection, synchronization, channel estimation, etc., for communication devices separated by greater distances.

In embodiment, the AP 114 and a plurality of client stations 154 are configured for multiple user (MU) communication using orthogonal frequency division multiple access (OFDMA) transmissions. In an embodiment, the PPDU 300 is an MU OFDMA data unit in which independent data streams are transmitted to or by multiple client stations 154 using respective sets of OFDM tones allocated to the client stations 154. For example, in an embodiment, available OFDM tones (e.g., OFDM tones that are not used as DC tones and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 300 is an MU-MIMO PHY data unit in which independent data streams are simultaneously transmitted to or by multiple client stations 154 using respective spatial streams allocated to the client stations 154.

Referring to FIGS. 2 and 3, in various embodiments, a communication device (e.g., the AP 114 or the client station 154-1) selectively utilizes the PHY format of the PPDU 200 or the PHY format of the PPDU 300 to transmit a control frame (e.g., an RTS frame, a CTS frame, a trigger frame, an acknowledgement frame, etc.). For example, the communication device selectively includes the control frame in the data portion 240 of the PPDU 200 when the control frame is to be transmitted in the first frequency band, the second frequency band or in the third frequency band. Referring now to FIG. 3, the communication device does not utilize the PHY format of the PPDU 300 for transmission of control frames in the second frequency band or in the third frequency band, in an embodiment. On the other hand, the communication device utilizes the PHY format of the PPDU 300 for transmission of control frames in the first frequency band in at least some situations, in an embodiment. For example, the communication device includes the control frame in the data portion 340 of the PPDU 300 when the control frame is to be transmitted in the first frequency band in at least some situations, in an embodiment. In an embodiment, the communication device utilizes SU PHY format of the PPDU 300 to transmit the control frame in the first frequency band. In another embodiment, in at least some situations, the communication device utilizes extended range SU PHY format of the PPDU 300 to transmit the control frame, for example when the control frame cannot be reliably transmitted using the SU PHY format of the PPDU 300. In yet another embodiment, the communication device utilizes MU PHY format of the PPDU 300 to transmit the control frame. For example, the communication device includes the control frame in one or more RUs of the PPDU 300, in an embodiment.

In an embodiment, a single user PPDU (the PPDU 200 of FIG. 2 or the SU PHY format of the PPDU 300 of FIG. 3) that includes a control frame spans a bandwidth no wider the bandwidth of a single component channel (e.g., a 20 MHz component channel) of a communication channel. In some embodiments, to cover multiple component channels of a communication channel, a duplicate PHY mode in which duplicates of the control frame are included in respective single user PPDUs that are simultaneously transmitted in respective ones of the multiple component channels of the communication channel.

Figure 4A:
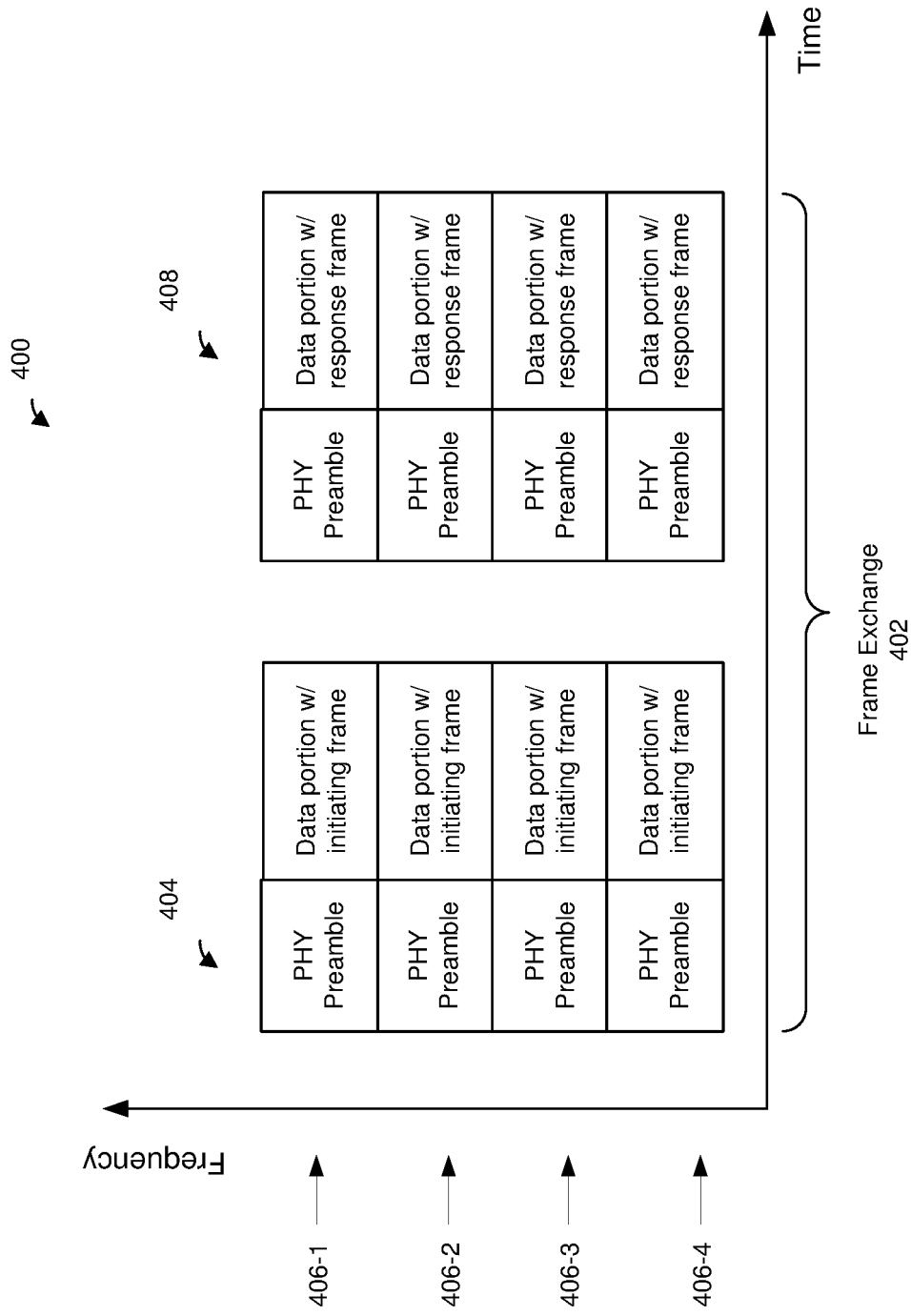
FIG. 4A is a diagram of an example transmission sequence that occurs during a TXOP in the WLAN 110 of FIG. 1, according to an embodiment.

FIG. 4A is a diagram of an example transmission sequence 400 that occurs during a TXOP, according to an embodiment. In an embodiment, the transmission sequence 400 occurs in the first frequency band. In another embodiment, the transmission sequence 400 occurs in the second frequency band or in the third frequency band. The transmission sequence 400 includes a frame exchange 402. In an embodiment, the frame exchange is a first frame exchange of a TXOP and is utilized to negotiate an available bandwidth to be used for transmissions during the TXOP and to protect the available bandwidth for the duration of the TXOP. In another embodiment, the frame exchange 402 is not the first frame exchange of a TXOP and/or the frame exchanged 402 is not used for bandwidth negotiation and/or protection. For example, the frame exchange 402 occurs during the TXOP after a previous frame exchange that occurred during the TXOP, in an embodiment.

In the frame exchange 402, a first communication device (e.g., the AP 114, the network interface 122, etc.) generates a PPDU 404 and transmits the PPDU 404 to at least one second communication device (e.g., at least one client station 154). The PPDU 404 spans multiple component channels 406 of a composite communication channel, in an embodiment. In an embodiment, the component channels 406 spun by the PPDU 404 are consecutive in frequency as illustrated in FIG. 4. In another embodiment, for example when a punctured communication channel is utilized, a gap exists between at least two of the component channels spun by the PPDU 404. For example, one of the component channels 406 (e.g., the component channel 406-2) is punctured, and therefore the first communication device generates the PPDU 404 to span the component channel 406-1, 406-3 and 406-4 and transmits the PPDU 404 without transmitting anything in the frequency portion corresponding to the punctured component channel 406-2, in an embodiment.

In an embodiment, at least a PHY preamble of the PPDU 404 is transmitted in each of the component channels 406 spun by the PPDU 404. The at least the portion of the preamble transmitted in each of the of the component channels 406 is decodable by other communication devices operating in the component channels of the composite communication channel, in an embodiment. In an embodiment, other communication devices that are operating in the vicinity of the first communication device and that are not intended recipients of the PPDU 404 receive at least the portion of the PPDU 404 transmitted in component channels 406 in which the communication devices are operating, and determine, based on duration information included in the at least the portion of the preamble of the PPDU a duration for which the communication channel is reserved by the first communication device. The other communication devices then refrain from attempting to access communication channel at least for the duration indicated in the PPDU 404, in an embodiment.

The PPDU 404 includes an initiating control frame (e.g., an RTS frame, a trigger frame, a trigger+QoS Null frame, etc.), in an embodiment. In another embodiment, the PPDU 404 includes a data frame (e.g., a QoS data frame, an A-MPDU, etc.) In an embodiment, in a scenario in which the frame exchange occurs in the first frequency band, the PPDU 404 that includes the initiating frame corresponds to the PPDU 200 of FIG. 2 transmitted in duplicate PHY mode. In another embodiment, in a scenario in which the frame exchange occurs in the first frequency band, the PPDU 404 that includes the initiating frame corresponds to the PPDU 300 of FIG. 3 transmitted in duplicate PHY mode.

In an embodiment, the first communication protocol permits transmission of a control frame in the first frequency band using a non-legacy PHY format, such as the HE SU PPDU format or the HE ER SU format of the PPDU 300 if the control frame i) is not solicited by another control frame and i) is not a trigger frame. In this embodiment, because the PPDU 404 includes the initiating control frame that is not solicited by any other control frame, the first communication device optionally generates the PPDU 400 to correspond to a non-legacy PHY format, such as the HE SU PPDU format or the HE ER SU format of the PPDU 300 if the initiating control frame is not a trigger frame, in an embodiment. On the other hand, if the initiating control frame included in the PPDU 300 is a trigger frame, the first communication device optionally generates the PPDU 400 to correspond to a legacy PHY format such as the PHY format of the PPDU 200 of FIG. 2, in an embodiment. In another embodiment, the first communication protocol permits transmission of a control frame in the first frequency band using a non-legacy PHY format, such as the HE SU PPDU format or the HE ER SU format of the PPDU 300 even if the control frame i) is solicited by another control frame and/or i) is a trigger frame.

In an embodiment, the first communication device selects, from among a set of possible PHY formats, a PHY format for the PPDU 404 that includes the initiating control frame based on one or both of i) the type of the initiating control frame and ii) PHY format(s) that are supported by one or more intended recipients of the initiating control frame. For example, in an embodiment, if the initiating control frame included in the PPDU 404 is not a MU-RTS frame, then the first communication device selects a PHY format, from among a legacy PHY format and one or more non-legacy PHY formats, for the PPDU 404, and generates the PPDU 404 to conform to the selected PHY format, where the selected PHY format must be supported by the intended recipient(s) of the initiating control frame. On the other hand, if the initiating control frame included in the PPDU 404 is an MU-RTS frame, then the first communication device generates the PPDU 404 according to the legacy PHY format even if intended receipt(s) of the initiating control frame support non-legacy PHY format(s).

In an embodiment, in a scenario in which the frame exchange 402 occurs in the second frequency band or the third frequency band, the first communication device generates the PPDU 404 to conform to a legacy PHY format such as the PHY format of the PPDU 200 of FIG. 2. In another embodiment, in a scenario in which the frame exchange 402 occurs in the second frequency band or the third frequency band, the first communication device generates the PPDU 404 selectively to conform to a legacy PHY format such as the PHY format of the PPDU 200 of FIG. 2 or a non-legacy PHY format such as the HE SU PPDU format or the HE SU ER PPDU format of the PPDU 300 of FIG. 3. For example, in an embodiment, the first communication device selectively generates the PPDU 404 that includes the initiating control frame that is not a trigger frame to conform to the HE SU PPDU format or the HE ER SU PPDU format if the initiating control frame is being transmitted using space-time block coding (STBC), and generates the PPDU 404 that includes the initiating control frame that is not a trigger frame to conform to the legacy PHY format if STBC is not utilized. In an embodiment, the first communication device selectively generates the PPDU 404 that includes the initiating control frame that is not a trigger frame to conform to the HE ER SU PPDU format if the intended receipt(s) of the initiating control frame support the HE ER SU PPDU format and, in some embodiments, only if a PPDU conforming to a non-extended rage PHY format cannot reliably reach the intended receipt(s) of the initiating control frame.

In response to receiving the PPDU 404, a second communication device (e.g., the client station 154-1) that is an intended recipient of the initiating control frame in the PPDU 404 generates and transmits a PPDU 408. In an embodiment, the PPDU 408 includes a responding control frame (e.g., a CTS frame). In another embodiment, the PPDU 408 includes a data frame. For example, in an embodiment in which the PPDU 404 includes a trigger frame that prompts the at least one second communication device to transmit data to the first communication device, the second communication device responds to the trigger frame in the PPDU 404 by including data in the PPDU 408 (e.g., in a frequency portion of the communication channel allocated to the second communication device as indicated in the trigger frame). In an embodiment, in a scenario in which the frame exchange 402 occurs in the second frequency band or the third frequency band, the second communication device generates the PPDU 408 to conform to a legacy PHY format, such as the PHY format of the PPDU 200 of FIG. 2, and using legacy transmission rules (e.g., using a data rate corresponding to a lowest modulation and coding scheme (MCS), using a single spatial stream, etc.). On the other hand, when the frame exchange 402 occurs in the first frequency band, the second communication device selectively generates the PPDU 408 to conform to a non-legacy PHY format, such as the HE SU PPDU, the HE ER SU PPDU or the HE MU PPDU format of the data unit 300 of FIG. 3 and/or using non-legacy transmission rules (e.g., using a higher MCS).

In an embodiment, the second communication device selects a number of spatial streams (Nss) and/or a MCS for transmission of the PPDU 408, and transmits the PPDU 408 using the selected Nss and/or MCS. In an embodiment, the second communication device transmits the PPDU 408 using a single Nss if the PPDU 408 is not a trigger-based PPDU (e.g., not an HE TB PPDU). In other words, a single Nss is used to transmit the PPDU 408 if the PPDU 404 does not include a trigger frame that prompts transmission of the PPDU 408, in an embodiment. In an embodiment, the second communication device selects an MCS for transmission of the PPDU 408 from a set of MCSs that do not exceed an MCS of the initiating control frame included in the PPDU 404.

In various embodiments, the PPDU 408 transmitted by the second communication device spans the same bandwidth, or a different bandwidth (e.g., a narrower bandwidth), as the bandwidth of the PPDU 404 that the second communication device receives from the first communication device. In an embodiment, the second communication device transmits the PPDU 408 as part of bandwidth negation for the TXOP. For example, in response to receiving the PPDU 404, the second communication device determines whether or not the component channels 406 spun by the PPDU 404 are idle and available for transmission by the second communication device. In an embodiment, the second communication device determines that a component channel 406 is idle if i) the value of a channel access counter (e.g., network navigation vector (NAV) timer) is zero and ii) channel sensing (e.g., clear channel assessment) performed by the second communication device for a predetermined time period after reception of the PPDU 404 indicates that the component channel is idle. In an embodiment, the predetermined time period is a time period corresponding to a point coordination function (PCF) interframe space (PIFS). In another embodiment, the predetermined time period is a short interframe space (SIFS). In another embodiment, another suitable predetermined time period is utilized.

In an embodiment in which static bandwidth negotiation is utilized, the second communication device transmits the PPDU 404 that spans the component channels 406 only if the second communication device determines that all component channels 406 are idle and available for transmission by the second communication device. If, on the other hand, the second communication device determines that one or more of the component channels 406 are not available for transmission by the second communication device, then the second communication device does not transmit the PPDU 408, in this embodiment. In another embodiment, in which dynamic bandwidth negotiation is utilized, the second communication device transmits the PPDU 408 that spans only those one or more component channels 406 that were determined to be idle and available for transmission by the second communication device). In an embodiment, dynamic bandwidth negotiation is performed using a legacy PHY data unit format (e.g., the duplicate non-HT PPDU format) for transmission of the PPDU 404 and PPDU 408. Other PHY data unit formats are not permitted for performing bandwidth negotiation, in this embodiment.

In an embodiment, the first communication device signals to the second communication device the bandwidth of the PPDU 404 and/or whether static bandwidth negotiation or dynamic bandwidth negotiation should be utilized by the second communication device to respond to the PPDU 404. For example, in an embodiment, the first communication device includes information indicating the bandwidth of the PPDU 404 and information indicating whether static or dynamic bandwidth should be utilized in a signal field (e.g., HE-SIG-A) of the PPDU 404. In another embodiment, the first communication device includes an indication of the bandwidth of the PPDU 404 and/or whether static or dynamic bandwidth should be utilized in a MAC header the PPDU 404. In other embodiments, other suitable signaling techniques are utilized for signaling the bandwidth of the PPDU 404 and/or whether static bandwidth negotiation or dynamic bandwidth negotiation should be utilized.

Figure 4B:
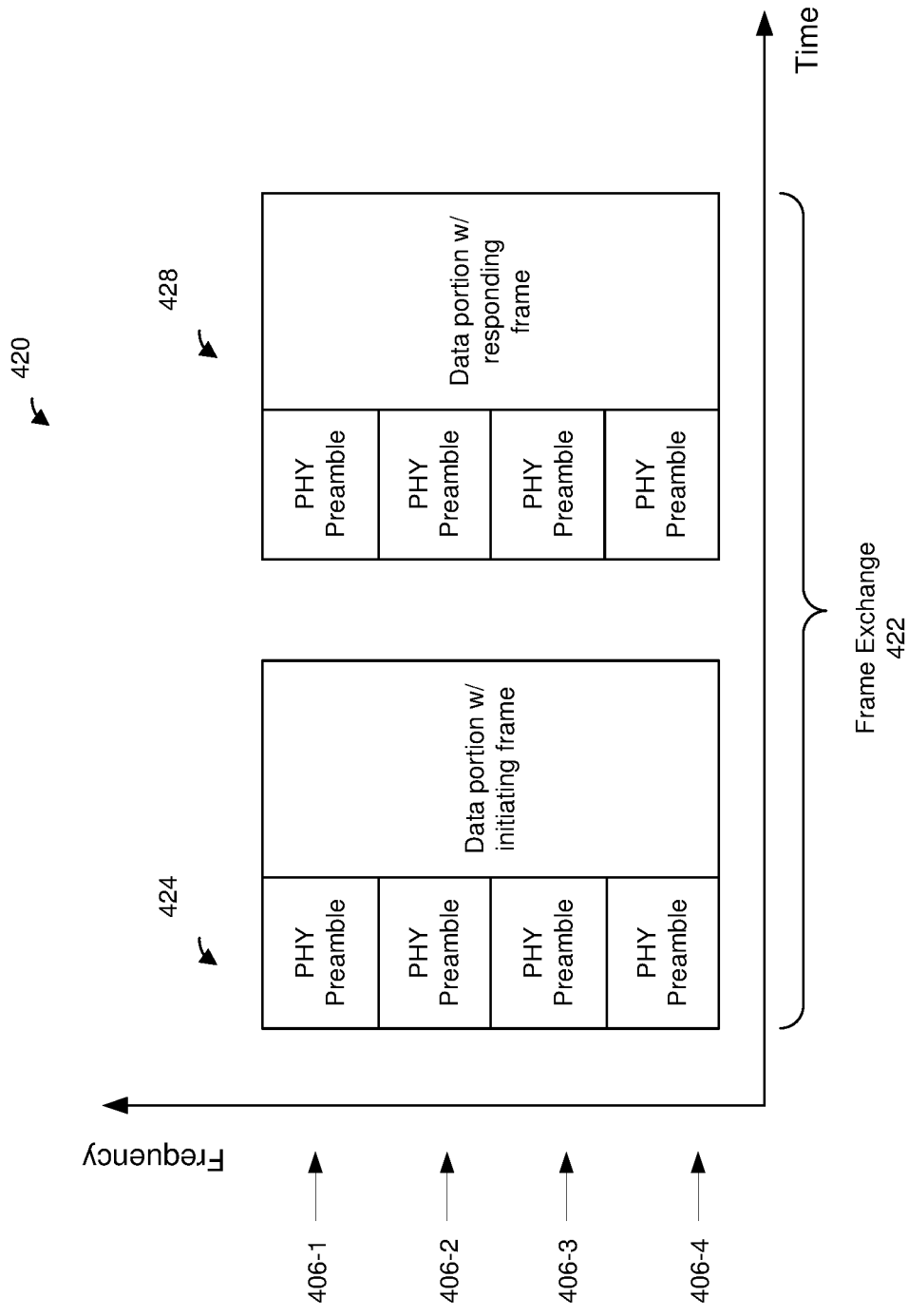
FIG. 4B is a diagram of another example transmission sequence that occurs during a TXOP in the WLAN 110 of FIG. 1, according to another embodiment.

FIG. 4B is a diagram of another example transmission sequence 420 that occurs during a TXOP, according to another embodiment. In an embodiment, the transmission sequence 420 occurs in the first frequency band. In another embodiment, the transmission sequence 420 occurs in the second frequency band or in the third frequency band. The transmission sequence 420 includes a frame exchange 422. In an embodiment, the frame exchange is a first frame exchange of a TXOP and is utilized to negotiate an available bandwidth to be used for transmissions during the TXOP and to protect the available bandwidth for the duration of the TXOP. In another embodiment, the frame exchange 422 is not the first frame exchange of a TXOP and/or the frame exchanged 422 is not used for bandwidth negotiation and/or protection. For example, the frame exchange 422 occurs during the TXOP after a previous frame exchange that occurred during the TXOP, in an embodiment.

The frame exchange 422 is generally the same as the frame exchange 402 of FIG. 4A except that in the frame exchange 422, an initiating frame is transmitted using a PPDU 424 that corresponds to a non-duplicate non-legacy PHY format such as the HE SU or the HE ER SU format of the PPDU 300 of FIG. 3. In this embodiment, the PHY preamble (e.g., the PHY preamble 302) of the PPDU 424 is duplicated in each component channel 406 spun by the PPDU 424, and the data portion of the PPDU 424 spans the entire bandwidth of the PPDU 424, in an embodiment. Similarly, in the frame exchange 422, a response frame is transmitted using a PPDU 428 that corresponds to a non-duplicate non-legacy PHY format such as the HE SU or the HE ER SU format of the PPDU 300 of FIG. 3. In this embodiment, the PHY preamble (e.g., the PHY preamble 302) of the PPDU 428 is duplicated in each component channel 406 spun by the PPDU 424, and the data portion of the PPDU 428 spans the entire bandwidth of the PPDU 428, in an embodiment.

Figure 4C:
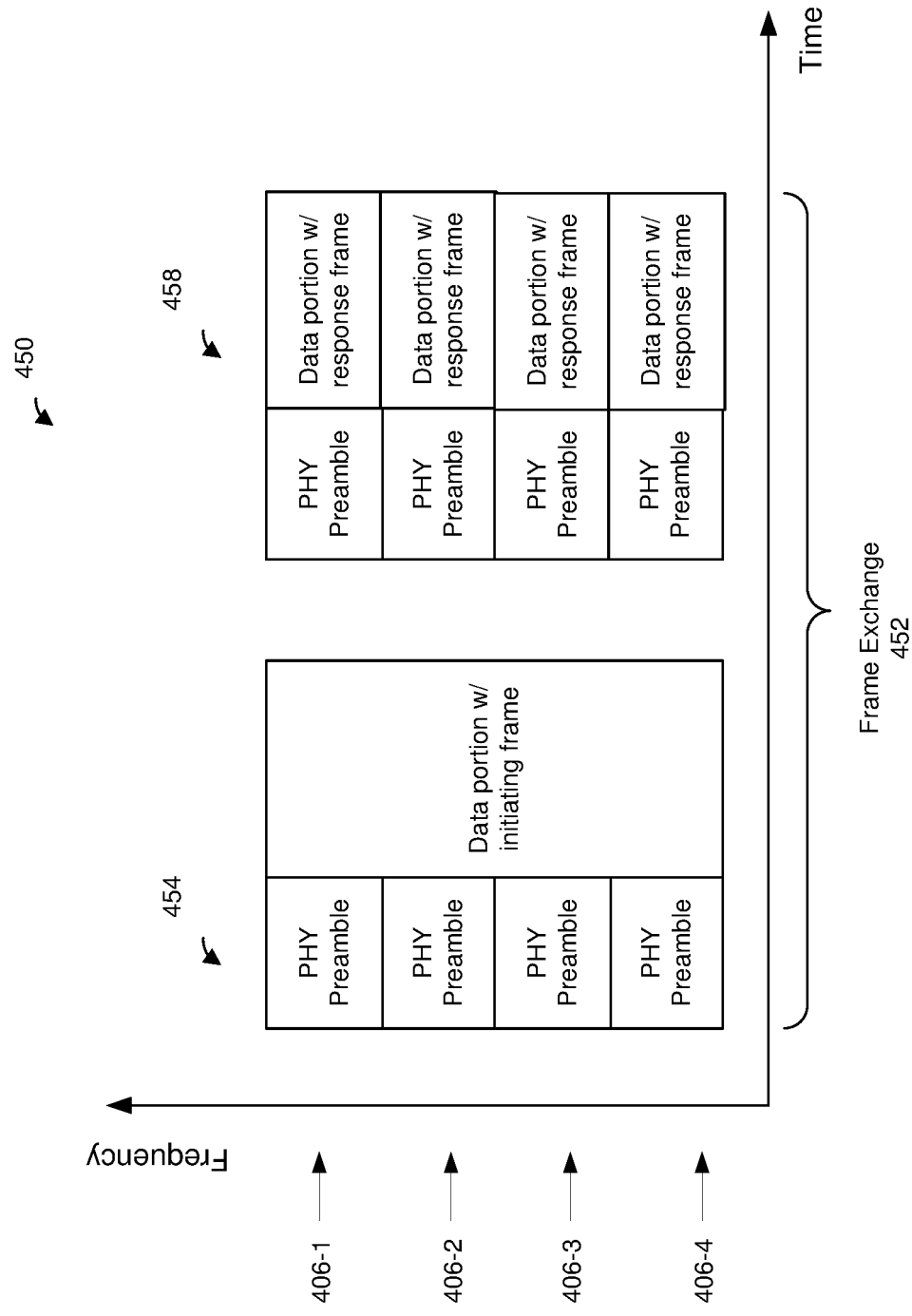
FIG. 4C is a diagram of yet another example transmission sequence that occurs during a TXOP in the WLAN 110 of FIG. 1, according to yet another embodiment.

FIG. 4C is a diagram of another example transmission sequence 450 that occurs during a TXOP, according to another embodiment. In an embodiment, the transmission sequence 450 occurs in the first frequency band. In another embodiment, the transmission sequence 450 occurs in the second frequency band or in the third frequency band. The transmission sequence 450 includes a frame exchange 452. In an embodiment, the frame exchange is a first frame exchange of a TXOP and is utilized to negotiate an available bandwidth to be used for transmissions during the TXOP and to protect the available bandwidth for the duration of the TXOP. In another embodiment, the frame exchange 452 is not the first frame exchange of a TXOP and/or the frame exchanged 452 is not used for bandwidth negotiation and/or protection. For example, the frame exchange 452 occurs during the TXOP after a previous frame exchange that occurred during the TXOP, in an embodiment.

Figure 5:
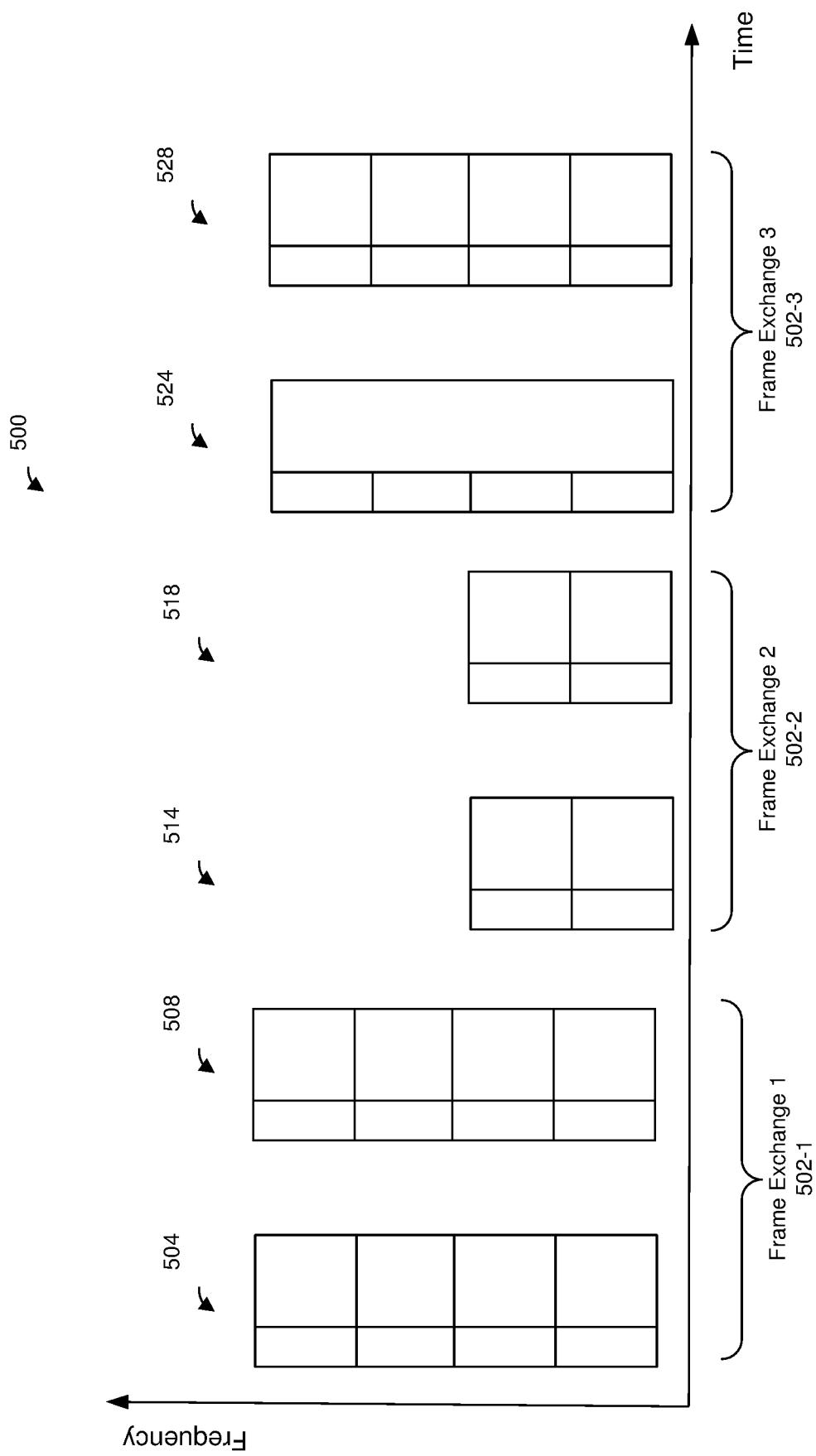
FIG. 5 is a diagram of an example transmission sequence in which multiple frame exchanges occur during a TXOP in the WLAN 110 of FIG. 1, according to another embodiment.

The frame exchange 452 is generally the same as the frame exchange 402 of FIG. 4A except that in the frame exchange 452, an initiating frame is transmitted using a PPDU 424 that corresponds to a non-duplicate non-legacy PHY format such as the HE SU or the HE ER SU format of the PPDU 300 of FIG. 3. In this embodiment, the PHY preamble (e.g., the PHY preamble 302) of the PPDU 454 is duplicated in each component channel 406 spun by the PPDU 424, and the data portion of the PPDU 454 spans the entire bandwidth of the PPDU 424, in an embodiment. The initiating frame included in the PPDU 454 includes a trigger frame that prompts transmission of a trigger based (TB) PPDU 458 that includes a response frame, in an embodiment. In this embodiment, the PHY preamble (e.g., the PHY preamble 302) of the PPDU 458 is duplicated in each component channel 406 spun by the PPDU 424, and the data portion of the PPDU 428 includes one or more respective response frames transmitted by one or more communication devices in respective ones of the component channel 406, in an embodiment FIG. 5 is a diagram of a transmission sequence 500 in which multiple frame exchanges 502 occur during a TXOP, according to an embodiment. Although three frame exchanges 502 are illustrated in FIG. 5, the transmission sequence 500 includes other suitable numbers of frame exchanges (e.g., 2, 5, 6, 7, etc.), in other embodiments. Each of the multiple frame exchanges 502 corresponds to the frame exchange 402 of FIG. 4, in an embodiment. In an embodiment, PHY formats and transmission rules for transmission of PPDUs of the frame exchange 402 of FIG. 4 are utilized for transmission of the corresponding PPDUs in each of the frame exchanges 502. In other embodiment, other suitable PHY formats and/or transmission rules are utilized.

In an embodiment, in a first frame exchange 502-1, a first communication device (e.g., the AP 114) generates and transmits a PPDU 504 to at least one second communication device. The PPDU 504 corresponds to one of the PPDU 404 of FIG. 4A, the PPDU 424 of FIG. 4B, or the PPDU 454 of FIG. 4C, in various embodiments. In another embodiment, the PPDU 504 corresponds to a suitable PPDU different from the PPDU 404 of FIG. 4A, the PPDU 424 of FIG. 4B, or the PPDU 454 of FIG. 4C. The PPDU 504 includes an initiating frame such as a control frame (e.g., an RTS frame, a trigger frame, etc.) or a data frame, in an embodiment.

In response to receiving the PPDU 504, at least one second communication device (e.g., the client station 154-1) that is an intended recipient of the initiating frame included in the PPDU 504 generates and transmits a PPDU 508. The PPDU 508 corresponds to one of the PPDU 408 of FIG. 4A, the PPDU 428 of FIG. 4B, or the PPDU 458 of FIG. 4C, in various embodiments. In another embodiment, the PPDU 508 corresponds to a suitable PPDU different from the PPDU 408 of FIG. 4A, the PPDU 428 of FIG. 4B, or the PPDU 458 of FIG. 4C. The PPDU 508 includes a responding frame such as a control frame (e.g., a CTS frame in response to an RTS frame included in the PPDU 504 or an acknowledgement frame to acknowledge receipt of a data frame in the PPDU 504) and/or includes data (e.g., in response to a trigger frame included in the PPDU 504), in various embodiments.

In an embodiment, the PPDU 504 spans a first bandwidth of a communication channel that includes one or more component channels. The PPDU 504 includes at least a preamble portion that is duplicated in each of the one or more component channels spun by the PPDU 504, in an embodiment. The preamble portion includes information indicating the bandwidth of the PPDU 504 and indicating a time duration of a remainder of the TXOP after transmission of the PPDU 504. For example, a signal field (e.g., HE-SIG-A field 320 in FIG. 3) of the PPDU 504 includes a bandwidth subfield (e.g., the BW subfield 342 in FIG. 3) for indicating the bandwidth of the PPDU 504 and a TXOP duration subfield (e.g., the TXOP duration subfield 344 in FIG. 3) for indicating the time duration of the remainder of the TXOP after transmission of the PPDU 504, in an embodiment. The value of the TXOP duration subfield in the signal field of the PPDU 504 reserves the communication channel corresponding to the bandwidth of the PPDU 504 for the indicated duration, in an embodiment. In an embodiment, the first communication device does not set the TXOP duration subfield to a value that indicates that the TXOP duration is unspecified. In other words, the first communication device sets the TXOP duration subfield to a valid value that indicates a valid duration of the remainder of the TXOP, in an embodiment.

In an embodiment, the PPDU 508 spans a second bandwidth of a communication channel that includes one or more component channels. The second bandwidth of the PPDU 508 is the same as the first bandwidth of the PPDU 504 when static bandwidth negotiation is utilized. On the other hand, when dynamic bandwidth is utilized, the second bandwidth of the PPDU 508 can be narrower than the first bandwidth of the PPDU 508, for example in a scenario in which the second communication device determines that one or more of the component channels spun by the PPDU 504 are idle and are not available for transmission by the second communication device.

The PPDU 508 includes at least a preamble portion that is duplicated in each of the one or more component channels spun by the PPDU 508, in an embodiment. The preamble portion includes information indicating the bandwidth of the PPDU 508 and indicating a time duration of a remainder of the TXOP after transmission of the PPDU 508. For example, a signal field (e.g., HE-SIG-A field 320 in FIG. 3) of the PPDU 508 includes a bandwidth subfield (e.g., the BW subfield 342 in FIG. 3) for indicating the bandwidth of the PPDU 508 and a TXOP duration subfield (e.g., the TXOP duration subfield 344 in FIG. 3) for indicating the time duration of the remainder of the TXOP after transmission of the PPDU 508, in an embodiment. The value of the TXOP duration subfield in the signal field of the PPDU 508 reserves the communication channel corresponding to the bandwidth of the PPDU 504 for the indicated duration, in an embodiment. In an embodiment, the first communication device does not set the TXOP duration subfield to a value that indicates that the TXOP duration is unspecified. In other words, the first communication device sets the TXOP duration subfield to a valid value that indicates a valid duration of the remainder of the TXOP, in an embodiment.

In the frame exchange 502-2 that follows the frame exchange 502-1, the first communication device transmits a PPDU 514 to the at least one second communication device. In an embodiment, the PPDU 514 includes a control frame (e.g., a trigger frame) and/or includes data for the at least one second communication device. In response to receiving the PPDU 514, the at least second communication device generates and transmits a PPDU 518 to the first communication device. The PPDU 518 includes a control frame (e.g., an acknowledgement frame) and/or includes data for the first communication device, in an embodiment.

In an embodiment, the bandwidth of the communication channel of the second frame exchange 502-2 (i.e., the bandwidth of the PPDU 514 and the PPDU 518) is reduced relative to the bandwidth of the communication channel of the first exchange 502-1 (i.e., the bandwidth of the PPDU 504 and the bandwidth of the PPDU 508), in an embodiment. For example, at the time of transmission of the PPDU 514, the first communication device determines that only a portion of the communication channel of the first frame exchange 502-1 is now available for transmission by the first communication device.

In the frame exchange 502-3 that follows the frame exchange 502-2, the first communication device transmits a PPDU 524 to the at least one second communication device. In an embodiment, the PPDU 524 includes a control frame (e.g., a trigger frame) and/or includes data for the at least one second communication device. In response to receiving the PPDU 524, the at least second communication device generates and transmits a PPDU 528 to the first communication device. The PPDU 528 includes a control frame (e.g., an acknowledgement frame) and/or includes data for the first communication device, in an embodiment In an embodiment, at the time of transmission of the PPDU 524, the first communication device determines that the bandwidth of the communication channel of the first frame exchange 502-1 is now available for transmission by the first communication device. The first communication device also determines that PPDUs 504, 508 of the first frame exchange 502-1 included valid TXOP duration indications that reserved the communication channel corresponding to the bandwidth of the first frame exchange 502-1 for the duration of the TXOP. In response to determining that PPDUs 504, 508 of the first frame exchange 502-1 included valid TXOP duration indications, the first communication device generates and transmits the PPDU 524 that spans the bandwidth of the first frame exchange 502-1 that is wider than the bandwidth of the second frame exchange 502-2, in an embodiment.

In response to receiving the PPDU 524 that spans the bandwidth of the first frame exchange 502-1 that is wider than the bandwidth of the second frame exchange 502-2, the second communication device generates and transmits the PPDU 528 to span the bandwidth of the first frame exchange 502-1 that is wider than the bandwidth of the second frame exchange 502-2, in an embodiment. Accordingly, the bandwidth of the frame exchange 502-3 is increased with respect to the bandwidth of the second frame exchange 502-2, in an embodiment.

Figure 6:
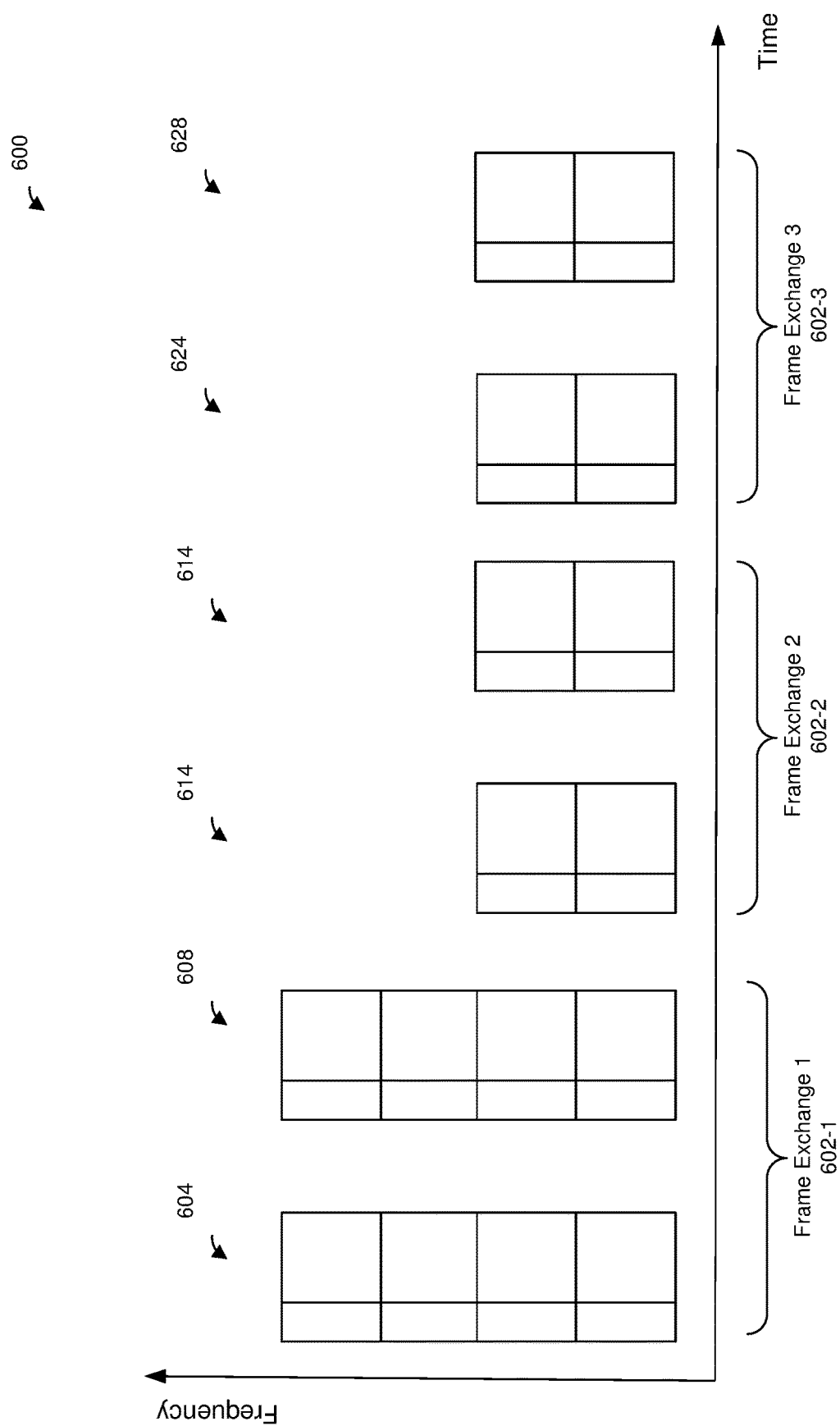
FIG. 6 is a diagram of another example transmission sequence in which multiple frame exchanges occur during a TXOP in the WLAN 110 of FIG. 1, according to an embodiment.

FIG. 6 is a diagram of a transmission sequence 600 in which multiple frame exchanges 602 occur during a TXOP, according to an embodiment. The transmission sequence 600 is generally the same as the transmission sequence 500 of FIG. 5, except that at least one of a PPDU 604 and a PPDU 608 transmitted during a first frame exchange 602-1 does not include a valid value that indicates a valid duration of the remainder of the TXOP after transmission of the PPDU, in an embodiment. For example, the first communication device sets the TXOP duration subfield 344 of the HE-SIG-A field 320 of PPDU 604 to a value that indicates that the TXOP duration is unspecified, in an embodiment. Additionally or alternatively, the second communication device sets the TXOP duration subfield 344 of the HE-SIG-A field 320 of PPDU 608 to a value that indicates that the TXOP duration is unspecified, in an embodiment. Because at least one of the PPDU 604 and the PPDU 608 transmitted during a first frame exchange 602-1 does not include a valid value that indicates a valid duration of the remainder of the TXOP, the communication channel corresponding to the first frame exchange 602 in the transmission sequence 600 is not reserved. Similar to the frame exchange 502-2 of the transmission sequence 500, a second frame exchange 602-2 in the transmission sequence 600 spans a bandwidth that is reduced with respect to the bandwidth of the first frame exchange 602-1. However, unlike the third frame exchange 502-3 of the transmission sequence 500, bandwidth of the third frame exchange 602-3 cannot be increased with respect to the bandwidth of the frame exchange 606-2 in the transmission sequence 600, in an embodiment. For example, at the time of transmission of the PPDU 624, the first communication device determines one or both of the PPDUs 604, 608 of the first frame exchange 602-1 included an unspecified TXOP duration value. In response to determining that one or both of the PPDUs 604, 608 of the first frame exchange 602-1 included an unspecified TXOP duration value, the first communication device generates and transmits the PPDU 624 that spans the bandwidth of the second frame exchange 602-2 even if the wider bandwidth of the first frame exchange 602-1 is again available for transmission by the first communication device, in an embodiment.

In an embodiment, when operating in the second frequency band and the third frequency band, communication devices (e.g., the AP 114 and the client stations) utilize a legacy channel access mechanism such as enhanced distributed channel access (EDCA) for determining when the communication device can transmit in the communication channel. In an embodiment, the legacy channel access mechanism is not used by at least some communication devices (e.g., at least client stations 154) when operating in the first frequency band. For example, the first communication protocol does not permit the use of the legacy channel access mechanism by client stations when operating in the first frequency band. In another embodiment, the AP 114 signals to the client stations 154 whether the client stations 154 are permitted to access the communication channel using the legacy channel access mechanism. In an embodiment, in scenarios in which client stations 154 are not permitted to use the legacy channel access mechanism, the client station 154 are permitted to transmit only when triggered by the AP 114 (e.g., in uplink MU transmissions triggered by the AP 114).

In some embodiments, a client station (e.g., the client station 154-1) signals to the AP 114 whether the client station supports disabling of the legacy channel access mechanism. For example, the client station includes an indication of whether the client station supports disabling of the legacy channel access mechanism in a capabilities element (e.g., HE capabilities element, HE extended capabilities element, etc.) that the client station transmits to the AP 114. When the client station signals to the AP 114 that the client station does not support disabling of the legacy channel access mechanism, then the client station can utilize the legacy channel access mechanism if the legacy channel access mechanism is disallowed by the AP 114, in an embodiment.

In an embodiment, the AP 114 disallows the legacy channel access mechanism in the first frequency band for only those client stations that are associated with the AP 114. In another embodiment, both client stations that are associated with the AP 114 and client stations that are not associated with the AP 114 are not allowed to utilize the legacy channel access mechanism in the first frequency band. In one such embodiment, a client station 154 that is not associated with the AP 114 performs association (e.g., transmits a probe request frame, an association request frame, etc.) using the legacy channel access technique. After associating with the AP 114 using the legacy channel access technique, the client station 154-1 disables the legacy channel access technique, in an embodiment. In another embodiment, a client station 154 that are not associated with the AP 114 performs association (e.g., transmits a probe request frame, an association request frame, etc.) with the AP 114 using a random access channel access technique such as an uplink OFDMA channel access technique. In another embodiment, a client station 154 that are not associated with the AP 114 associates with the AP 114 in the second frequency band or the third frequency band in which the legacy channel access technique is allowed, using the legacy channel access technique. After associating with the AP 114 the client station 154 switches to the first frequency band and disables the legacy channel access technique.

Figures 7A, 7B:
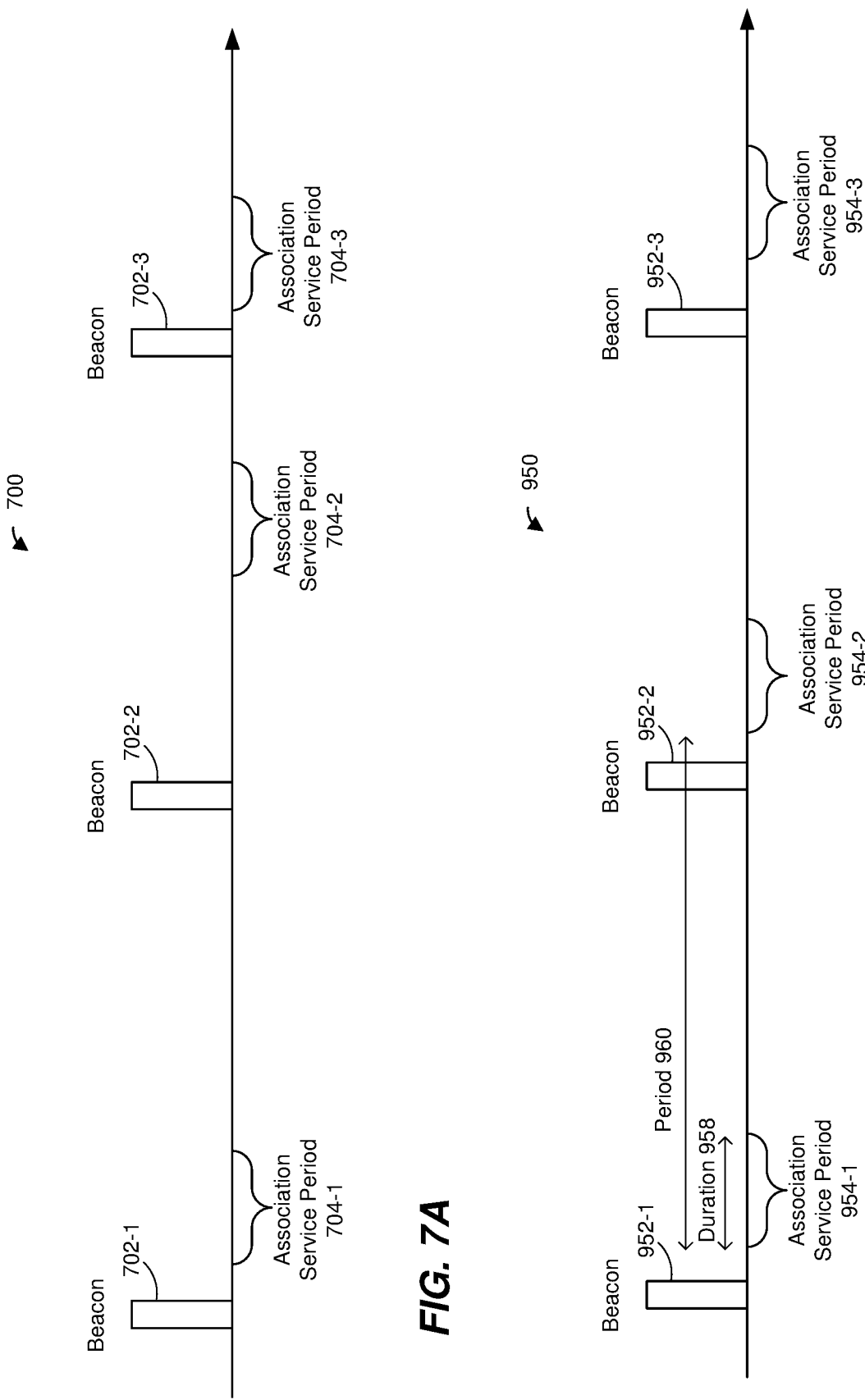
FIG. 7A is a diagram illustrating an example scheme of association service periods used in the WLAN 110 of FIG. 1, according to an embodiment.
FIG. 7B is a diagram illustrating another example scheme of association service periods used in the WLAN 110 of FIG. 1, according to an embodiment.

In some embodiments in which client station 154 that are not associated with the AP 114 utilize the legacy channel access technique to perform association with the AP 114, the client stations 154 perform the association during an association service period announced by the AP 114. FIG. 7A is a diagram illustrating a scheme 700 of association service periods used in the WLAN 110 of FIG. 1, according to an embodiment. In scheme 700, the association periods are not periodic. In an embodiment, the AP 114 announces respective independent association periods 704 in each of some or all of management frame (e.g., beacon frame) 702 transmitted by the AP 114. For example, each beacon frame 702 includes an indication of a start time and an end time of a corresponding association service period 704, in an embodiment. FIG. 7B is a diagram illustrating a scheme 750 of association service periods used in the WLAN 110 of FIG. 1, according to an embodiment. In the scheme 750, the association service periods are periodic. In an embodiment, the AP 114 announces periodicity of association periods 754 in each of some or all of management frame (e.g., beacon frame) 752 transmitted by the AP 114. For example, the beacon frame 752-1 includes an indication of a start time of a first association period 954-1, a duration of the first association period 954-1 and a period, or a time duration between two consecutive association service periods 954. The association service periods 954 occur at the times indicated by the start time and period indications in the beacon frame 952-1, in an embodiment.

Figure 8:
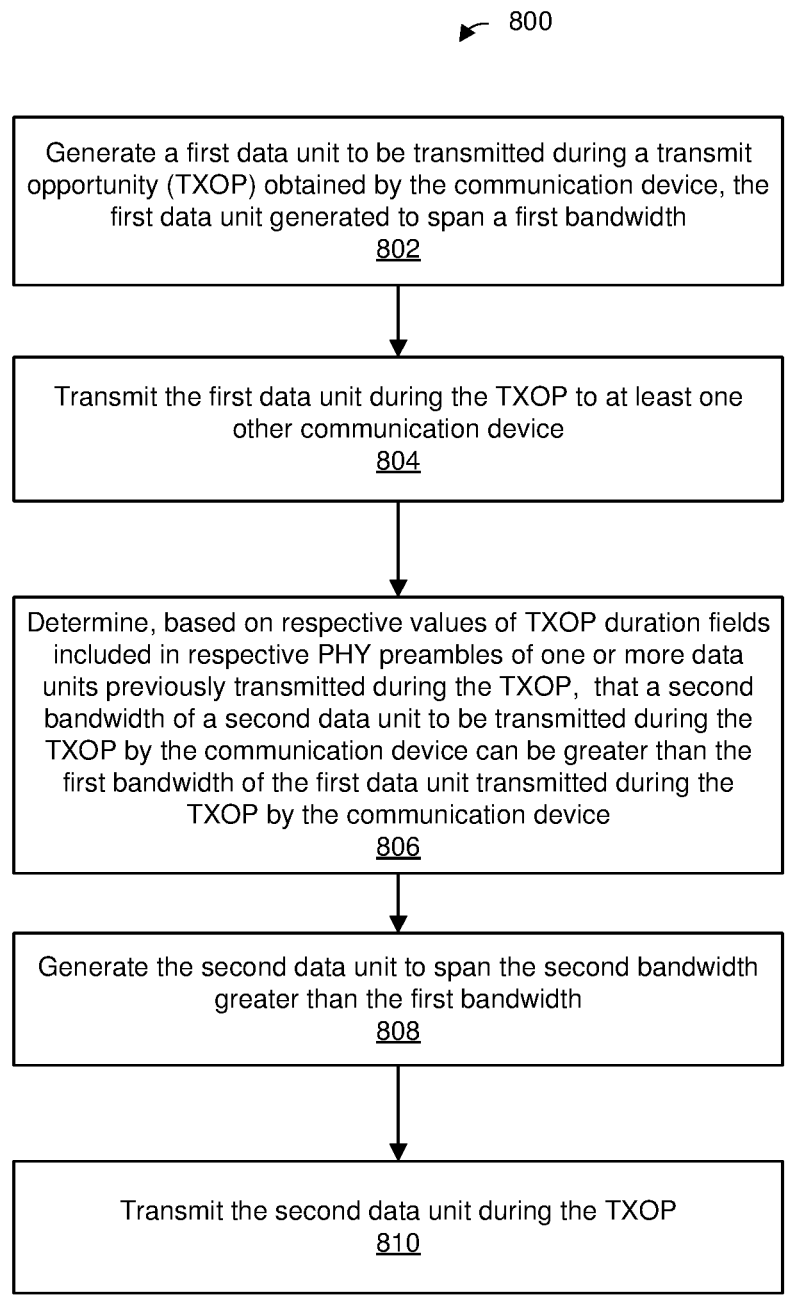
FIG. 8 is a flow diagram of an example method, implemented in the WLAN of FIG. 1, for transmitting multiple data units in a communication channel, according to an embodiment.

FIG. 8 is a flow diagram of an example method 800 for transmitting multiple data units in a communication channel, according to an embodiment. In some embodiments, the AP 114 of FIG. 1 is configured to implement the method 1400. The method 1400 is described, however, in the context of the AP 114 merely for explanatory purposes and, in other embodiments, the method 1400 is implemented by another suitable device such as the client station 154-1 or another suitable wireless communication device.

At block 802, the AP 114 generates (e.g., the network interface device 122 generates) a first data unit to be transmitted during a TXOP obtained by the AP 114. In an embodiment, the AP 114 generate the PPDU 514 of FIG. 5. In another embodiment, the AP 114 generates a suitable data unit different from the PPDU 514 of FIG. 5. In an embodiment, the AP 114 generates the first data unit to span a first bandwidth. For example, the AP 114 generates the first data unit to span a first bandwidth that spans one or more component channel of the communication channel. At block 804, the AP 114 transmits the first data unit during the TXOP to at least one client station 154.

At block 806, the AP 114 determines that a second bandwidth of a second data unit to be transmitted in the TXOP can be greater than the first bandwidth of the first data unit transmitted, at block 804, during the TXOP. For example, the AP 114 determines that a larger frequency portion of the communication channel is now idle and available for transmission by the AP 114 as compared to the time at which the first data unit was transmitted by the AP 114. In an embodiment, the AP 114 determines that second bandwidth of the second data unit can be greater than the first bandwidth of the first data unit based on respective values of TXOP duration fields included in respective PHY preambles of one or more data units transmitted a previous frame exchange during the TXOP. For example, the AP 114 determines that second bandwidth of the second data unit can be greater than the first bandwidth of the first data unit based on determining that each data unit transmitted in an initial frame exchange during the TXOP included, in respective PHY preambles of the data units, valid TXOP duration indications that reserved the communication channel corresponding to the bandwidth of the initial frame exchange for the duration of the TXOP. Determining that the second bandwidth of the second data unit can be greater than the first bandwidth of the first data unit based on respective values of TXOP duration fields included in data units transmitted during a previous frame exchange that occurred during the TXOP allows the AP 114 to increase the bandwidth of the second data unit relative to the bandwidth of the first data unit even if the TXOP is not protected by an initial control frame exchange that conforms to a legacy communication protocol, in an embodiment.

At block 808, the AP 114 generates the second data unit. In an embodiment, AP 114 generates the PPDU 524 of FIG. 5. In another embodiment, the AP 114 generates a data unit different from the PPDU 524 of FIG. 5. Block 806 is performed in response to determining, at block 804 that the second bandwidth of the second data unit transmitted during the TXOP can be greater than the first bandwidth of the first data unit transmitted during the TXOP, in an embedment.

At block 810, the AP 114 transmits the second data unit during the TXOP to the at least one other communication device. In an embodiment, because the second bandwidth of the second data unit is increased with respect to the first bandwidth of the first data unit transmitted during the TXOP, more information (e.g., management information, data, etc.) can be transmitted in the second data unit transmitted during the TXOP as compared to systems in which data unit bandwidth cannot be increased during the TXOP unless the TXOP is protected by an initial control frame exchange that conforms to a legacy communication protocol, in at least some embodiments.

In various embodiments, a method comprises one of, or any suitable combination of two or more of, the following features.

Embodiment 1: A method for transmitting multiple data units in a communication channel includes: generating, at a communication device, a first data unit to be transmitted during a transmit opportunity (TXOP) obtained by the communication device, the first data unit generated to span a first bandwidth; transmitting, by the communication device, the first data unit during the TXOP to at least one other communication device; determining, at the communication device based on respective values of TXOP duration fields included in respective physical layer (PHY) preambles of one or more data units previously transmitted during the TXOP, whether a second bandwidth of a second data unit to be transmitted during the TXOP by the communication device can be greater than the first bandwidth of the first data unit transmitted during the TXOP by the communication device; in response to determining that the second bandwidth of the second data unit transmitted during the TXOP can be greater than the first bandwidth of the first data unit transmitted during the TXOP, generating, at the communication device, the second data unit to span the second bandwidth greater than the first bandwidth, and transmitting, by the communication device, the second data unit during the TXOP.

Embodiment 2: The method of embodiment 1, wherein transmitting the second data unit comprises transmitting the second data unit after transmitting the first data unit.

Embodiment 3: The method of embodiments 1 or 2, wherein determining that the second bandwidth of the second data unit can be greater than the first bandwidth of the first data unit includes determining that each data unit transmitted during an initial frame exchange of the TXOP included, in a signal field included in the PHY preamble of the data unit, a respective TXOP duration indication set to a duration value other than an unspecified duration value.

Embodiment 4: The method of any of embodiments 1-3, further comprising determining the second bandwidth of the second data unit such that the second bandwidth does not exceed a bandwidth corresponding to the initial frame exchange during the TXOP.

Embodiment 5: The method of any of embodiments 1-4, wherein generating the data unit includes determining a value of a TXOP duration field, wherein setting the TXOP duration field to indicate an unspecified TXOP duration is not allowed unless one or both i) basic service set (BSS) color is currently disabled in a BSS in which the communication device is operating and ii) the data unit includes a power save poll (PS-poll) frame, generating the TXOP duration field, including setting the TXOP duration field to the determined value, and generating the data unit to include the TXOP duration field.

Embodiment 6: The method of any of embodiments 1-5, further comprising, prior to transmitting the first data unit, transmitting, by the communication device to the at least one other communication device, an initiating data unit that includes an initiating control frame, and receiving, from the at least one other communication device, a responding data unit that includes a response to the initiating control frame.

Embodiment 7: The method of embodiment 6, wherein the communication device supports operation according to a first communication protocol and a second communication protocol that is legacy with respect to the first communication protocol, and transmitting the initiating data unit comprises transmitting the initiating data unit using a non-legacy PHY data unit specified by the first communication protocol and not specified by the second communication protocol.

Embodiment 8: The method of embodiment 7, wherein transmitting the initiating data unit using a non-legacy physical layer (PHY) data unit format comprises transmitting the initiation data unit using an extended range PHY data unit format that extends a range of the initiating data unit with respect to ranges of legacy data units transmitted using legacy PHY data unit formats.

Embodiment 9: The method of embodiment 6, wherein the communication device supports operation according to a first communication protocol and a second communication protocol that is legacy with respect to the first communication protocol, and receiving the responding data unit comprises receiving the initiating data unit transmitted using a non-legacy PHY data unit specified by the first communication protocol and not specified by the second communication protocol.

Embodiment 10: The method of embodiment 9, wherein receiving the responding data unit comprises receiving the initiating data unit transmitted using an extended range PHY data unit format that extends a range of the initiating data unit with respect to ranges of legacy data units transmitted using legacy PHY data unit formats.

Embodiment 11: A communication device comprises a network interface device having one or more integrated circuit (IC) devices configured to: generate a first data unit to be transmitted during a transmit opportunity (TXOP) obtained by the communication device, the first data unit generated to span a first bandwidth, transmit the first data unit during the TXOP to at least one other communication device, determine, based on respective values of TXOP duration fields included in respective physical layer (PHY) preambles of one or more data units previously transmitted during the TXOP, that a second bandwidth of a second data unit to be transmitted during the TXOP by the communication device can be greater than the first bandwidth of the first data unit transmitted during the TXOP by the communication device, in response to determining that the second bandwidth of the second data unit transmitted during the TXOP can be greater than the first bandwidth of the first data unit transmitted during the TXOP, generate the second data unit to span the second bandwidth greater than the first bandwidth, and transmit the second data unit during the TXOP.

Embodiment 12: The communication device of embodiment 11, wherein the one or more IC devices are configured to transmit the second data unit after transmitting the first data unit.

Embodiment 13: The communication device of embodiments 11 or 12, wherein the one or more IC devices are configured to determine that the second bandwidth of the second data unit can be greater than the first bandwidth of the first data unit at least by determining that each data unit transmitted during an initial frame exchange of the TXOP included, in a signal field of the PHY preamble of the data unit, a respective TXOP duration indication set to a duration value other than an unspecified duration value.

Embodiment 14: The communication device of any of embodiments 11-13, wherein the one or more IC devices are further configured to determine the second bandwidth of the second data unit such that the second bandwidth does not exceed a bandwidth of the initial frame exchange during the TXOP.

Embodiment 15: The communication device of any of embodiments 11-14, wherein the one or more IC devices are further configured to determine a value of a TXOP duration field, wherein setting the TXOP duration field to indicate an unspecified TXOP duration is not allowed unless one or both i) basic service set (BSS) color is currently disabled in a BSS in which the communication device is operating and ii) the data unit includes a power save poll (PS-poll) frame, generate the TXOP duration field, including setting the TXOP duration field to the determined value, and generate the data unit to include the TXOP duration field.

Embodiment 16: The communication device of any of embodiments 11-15, wherein the one or more IC devices are further configured to, prior to transmitting the first data unit, transmit, to the at least one other communication device, an initiating data unit that includes an initiating control frame, and receive, from the at least one other communication device, a responding data unit that includes a response to the initiating control frame.

Embodiment 17: The communication device of embodiment 16, wherein the communication device supports operation according to a first communication protocol and a second communication protocol that is legacy with respect to the first communication protocol, and the one or more IC devices are configured to transmit the initiating data unit using a non-legacy PHY data unit specified by the first communication protocol and not specified by the second communication protocol.

Embodiment 18: The communication device of embodiment 17, wherein the one or more IC devices are configured to transmit the initiation data unit using an extended range PHY data unit format that extends a range of the initiating data unit with respect to ranges of legacy data units transmitted using legacy PHY data unit formats.

Embodiment 19: The communication device of embodiment 16, wherein the communication device supports operation according to a first communication protocol and a second communication protocol that is legacy with respect to the first communication protocol, and the one or more IC devices are configured to receive the initiating data unit transmitted using a non-legacy PHY data unit specified by the first communication protocol and not specified by the second communication protocol.

Embodiment 19: The communication device of embodiment 19, wherein the one or more IC devices are configured to receive initiating data unit transmitted using an extended range PHY data unit format that extends a range of the initiating data unit with respect to ranges of legacy data units transmitted using legacy PHY data unit formats.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN), the method comprising:
   determining, at a communication device, whether a basic service set (BSS) color is currently disabled for the WLAN;
   in response to determining that the BSS color is currently disabled for the WLAN:
      determining, at the communication device, that a transmit opportunity (TXOP) duration subfield in a physical layer (PHY) preamble of a PHY data unit is to be set to a value defined by a WLAN communication protocol for indicating a TXOP duration that is unspecified, and
      generating, at the communication device, the PHY data unit so that the TXOP duration subfield is set to the value defined by the WLAN communication for indicating the TXOP duration that is unspecified; and
   transmitting, by the communication device, the PHY data unit.

2. The method of claim 1, further comprising:
   generating the PHY data unit to include the TXOP duration subfield in a signal field of the PHY preamble.

3. The method of claim 1, wherein determining whether the BSS color is currently disabled for the WLAN comprises:
   receiving, at the communication device, information from another communication device that indicates whether the BSS color is currently disabled for the WLAN.

4. The method of claim 1, further comprising:
   determining, at the communication device, whether the PHY data unit is to include a power save poll (PS-Poll) frame; and
   in response to determining that the PHY data unit is to include a PS-Poll frame:
      generating, at the communication device, the PHY data unit to include the PS-Poll frame, and
      determining that the TXOP duration subfield is to be set to the value defined by the WLAN communication protocol for indicating the TXOP duration that is unspecified, and
      generating, at the communication device, the PHY data unit so that the TXOP duration subfield is set to the value defined by the WLAN communication for indicating the TXOP duration that is unspecified.

5. The method of claim 4, further comprising:
   determining, at the communication device, whether the PHY data unit is to be transmitted in a first frequency band from among multiple frequency bands in which the WLAN communication protocol permits operation, wherein the multiple frequency bands includes at least a second frequency band;
   in response to i) determining that the PHY data unit is to be transmitted in the first frequency band, ii) determining that the PHY data unit is not to include a PS-Poll frame, and iii) determining that the BSS color is not currently disabled for the WLAN:
      determining, at the communication device, that the TXOP duration subfield in the PHY preamble of the PHY data unit cannot be set to the value defined by the WLAN communication protocol for indicating the TXOP duration that is unspecified, and generating, at the communication device, the PHY data unit so that the TXOP duration subfield is set to a duration value that is different than the value defined by the WLAN communication for indicating the TXOP duration that is unspecified.

6. The method of claim 5, wherein generating the PHY data unit so that the TXOP duration subfield is set to the duration value that is different than the value defined by the WLAN communication for indicating the TXOP duration that is unspecified comprises:

setting the TXOP duration subfield to a value that corresponds to a remaining duration of a TXOP in the WLAN.

7. The method of claim 5, wherein determining whether the PHY data unit is to be transmitted in the first frequency band comprises determining whether the PHY data unit is to be transmitted in a 6 GHz frequency band, and wherein the second frequency band is one of i) a 2.4 GHz frequency band and ii) a 5 GHz frequency band.

8. A communication device for communicating in a wireless local area network (WLAN), comprising:

a wireless network interface device having circuitry configured to:
  determine whether a basic service set (BSS) color is currently disabled for the WLAN, and
  in response to determining that the BSS color is currently disabled for the WLAN:
    determine that a transmit opportunity (TXOP) duration subfield in a physical layer (PHY) preamble of a PHY data unit is to be set to a value defined by a WLAN communication protocol for indicating a TXOP duration that is unspecified, and
    generate the PHY data unit so that the TXOP duration subfield is set to the value defined by the WLAN communication for indicating the TXOP duration that is unspecified; and
wherein the circuitry is further configured to control the wireless network interface device to transmit the PHY data unit.

9. The communication device of claim 8, wherein the circuitry is further configured to:
generate the PHY data unit to include the TXOP duration subfield in a signal field of the PHY preamble.

10. The communication device of claim 8, wherein the circuitry is further configured to:
receive information from another communication device that indicates whether the BSS color is currently disabled for the WLAN; and
use the information from other communication device to determine whether the BSS color is currently disabled for the WLAN.

11. The communication device of claim 8, wherein the circuitry is further configured to:
determine whether the PHY data unit is to include a power save poll (PS-Poll) frame; and
in response to determining that the PHY data unit is to include a PS-Poll frame:
  generate the PHY data unit to include the PS-Poll frame, and
  generate the PHY data unit so that the TXOP duration subfield is set to the value defined by the WLAN communication for indicating the TXOP duration that is unspecified.

12. The communication device of claim 11, wherein the circuitry is further configured to:
determine whether the PHY data unit is to be transmitted in a first frequency band from among multiple frequency bands in which the WLAN communication protocol permits operation, wherein the multiple frequency bands includes at least a second frequency band;
in response to i) determining that the PHY data unit is to be transmitted in the first frequency band, ii) determining that the PHY data unit is not to include a PS-Poll frame, and iii) determining that the BSS color is not currently disabled for the WLAN:
  determine that the TXOP duration subfield in the PHY preamble of the PHY data unit cannot be set to the value defined by the WLAN communication protocol for indicating the TXOP duration that is unspecified, and
  generate the PHY data unit so that the TXOP duration subfield is set to a duration value that is different than the value defined by the WLAN communication for indicating the TXOP duration that is unspecified.

13. The communication device of claim 12, wherein the circuitry is further configured to set the TXOP duration subfield to the duration value that is different than the value defined by the WLAN communication for indicating the TXOP duration that is unspecified at least by:
setting the TXOP duration subfield to a value that corresponds to a remaining duration of a TXOP in the WLAN.

14. The communication device of claim 12, wherein the circuitry is further configured to determine whether the PHY data unit is to be transmitted in the first frequency band at least by determining whether the PHY data unit is to be transmitted in a 6 GHz frequency band, and wherein the second frequency band is one of i) a 2.4 GHz frequency band and ii) a 5 GHz frequency band.

15. The communication device of claim 8, wherein:
the wireless network interface device comprises one or more transceivers; and
the circuitry is configured to control the one or more transceivers to transmit the PHY data unit.

16. The communication device of claim 15, further comprising:
one or more antennas coupled to the one or more transceivers.

17. A method for communicating in a wireless local area network (WLAN), the method comprising:
determining, at the communication device, whether a physical layer (PHY) data unit is to include a power save poll (PS-Poll) frame; and
in response to determining that the PHY data unit is to include the PS-Poll frame:
  generating, at the communication device, the PHY data unit to include the PS-Poll frame,
  determining, at the communication device, that a transmit opportunity (TXOP) duration subfield in a PHY preamble of the PHY data unit is to be set to a value defined by a WLAN communication protocol for indicating a TXOP duration that is unspecified, and
  generating, at the communication device, the PHY data unit so that the TXOP duration subfield is set to the value defined by the WLAN communication for indicating the TXOP duration that is unspecified; and
transmitting, by the communication device, the PHY data unit.

18. The method of claim 17, further comprising:
generating the PHY data unit to include the TXOP duration subfield in a signal field of the PHY preamble.

19. A communication device for communicating in a wireless local area network (WLAN), comprising:
a wireless network interface device having circuitry configured to:
determine whether a physical layer (PHY) data unit is to include a power save poll (PS-Poll) frame, and
in response to determining that the PHY data unit is to include the PS-Poll frame:
generate the PHY data unit to include the PS-Poll frame,
determine that a transmit opportunity (TXOP) duration subfield in a PHY preamble of the PHY data unit is to be set to a value defined by a WLAN communication protocol for indicating a TXOP duration that is unspecified, and
generate the PHY data unit so that the TXOP duration subfield is set to the value defined by the WLAN communication for indicating the TXOP duration that is unspecified; and
wherein the circuitry is further configured to control the wireless network interface device to transmit the PHY data unit.

20. The communication device of claim 19, wherein the circuitry is further configured to:
generate the PHY data unit to include the TXOP duration subfield in a signal field of the PHY preamble.

21. The communication device of claim 19, wherein:
the wireless network interface device comprises one or more transceivers; and
the circuitry is configured to control the one or more transceivers to transmit the PHY data unit.

22. The communication device of claim 21, further comprising:
one or more antennas coupled to the one or more transceivers.

* * * * *